(12) United States Patent
Huang

(10) Patent No.: US 8,091,855 B1
(45) Date of Patent: Jan. 10, 2012

(54) FLUORINATED ELASTOMERIC BLOWOUT PREVENTER PACKERS AND METHOD

(75) Inventor: Ming Yu Huang, Kingwood, TX (US)

(73) Assignee: Hydril USA Manufacturing LLC, Houston, TX (US)

( * ) Notice: Subject to any disclaimer, the term of this patent is extended or adjusted under 35 U.S.C. 154(b) by 5 days.

(21) Appl. No.: 12/827,383

(22) Filed: Jun. 30, 2010

(51) Int. Cl.
*E21B 33/06* (2006.01)

(52) U.S. Cl. .......... 251/1.1; 251/1.3; 166/85.4; 524/556

(58) Field of Classification Search .................. 251/1.1, 251/1.3; 166/85.4; 524/556
See application file for complete search history.

(56) References Cited

U.S. PATENT DOCUMENTS

| | | | |
|---|---|---|---|
| 4,419,479 A | | 12/1983 | Springer |
| 4,431,704 A | * | 2/1984 | Springer ........................ 428/450 |
| 4,508,312 A | * | 4/1985 | Taylor et al. .................... 251/1.3 |
| 4,631,309 A | * | 12/1986 | Thormer et al. ............... 524/426 |
| 4,900,793 A | | 2/1990 | Lagow et al. |
| 5,214,102 A | | 5/1993 | Zielinski et al. |
| 5,274,049 A | | 12/1993 | Zielinski et al. |
| 5,393,329 A | * | 2/1995 | Inagaki et al. .................... 96/131 |
| 6,037,418 A | * | 3/2000 | Mukai et al. ..................... 525/242 |
| 7,252,888 B2 | * | 8/2007 | Osen et al. ...................... 428/500 |
| 7,842,732 B2 | * | 11/2010 | Ziser et al. ........................ 516/98 |
| 2003/0144400 A1 | * | 7/2003 | Osen et al. ...................... 524/432 |
| 2006/0205881 A1 | * | 9/2006 | Gozdiff et al. ................. 525/191 |
| 2010/0140516 A1 | * | 6/2010 | Butuc ............................ 251/1.1 |

OTHER PUBLICATIONS

Vega-Cantu, Y., et al, "Enhancement of the Chemical Resistance of Nitrile Rubber by Direct Fluorination", Journal of Applied Polymer Science, vol. 89, pp. 971-979 (2003).
European Search Report mailed on Nov. 3. 2011 in related application No. 11171993.6.

* cited by examiner

*Primary Examiner* — Bernard Lipman
(74) *Attorney, Agent, or Firm* — Potomac Patent Group PLLC.

(57) ABSTRACT

A packer unit to be used in an annular blowout preventer. The packer unit includes an elastomer body including a compound of a carboxylated nitrile rubber (XNBR) base polymer having a polymer chain, and a quantity of fluorine atoms attached to the polymer chain. The compound includes between 50 and 60% XNBR, between 25 to 35% carbon black, and the rest includes other materials. The quantity of fluorine atoms displaces at least an equal quantity of hydrogen atoms from the polymer chain when the elastomer body is fluorinated.

20 Claims, 20 Drawing Sheets

FLUORINATED ELASTOMERIC BLOWOUT PREVENTER PACKERS AND METHOD

BACKGROUND

1. Technical Field

Embodiments of the subject matter disclosed herein generally relate to methods and systems and, more particularly, to mechanisms and techniques for producing fluorinated elastomeric blowout preventer packers that better withstand harsh environments than existing packers.

2. Discussion of the Background

During the past years, with the increase in price of fossil fuels, the interest in developing new wells has dramatically increased. When drilling a well, for example, in oil and gas exploration applications, safety devices are put in place to prevent injury to personnel and damage to environment and/or equipment resulting from unexpected events associated with the drilling activities. Thus, well control is an important aspect of oil and gas exploration.

Drilling wells in oil and gas exploration involves penetrating a variety of subsurface geologic structures, or "layers." Occasionally, a wellbore will penetrate a layer having a formation pressure substantially higher than the pressure maintained in the wellbore. When this occurs, the well is said to have "taken a kick." The pressure increase associated with the kick is generally produced by an influx of formation fluids (which may be a liquid, a gas, or a combination thereof) into the wellbore. The relatively high pressure kick tends to propagate from a point of entry in the wellbore uphole (from a high pressure region to a low pressure region). If the kick is allowed to reach the surface, drilling fluid, well tools, and other drilling structures may be blown out of the wellbore and the integrity of the well may be destroyed with grave consequences for the environment (e.g., uncontrolled oil spills undersea). These "blowouts" may also result in catastrophic destruction of the drilling equipment (including, for example, the drilling rig) and substantial injury or death of rig personnel.

Because of the risk of blowouts, blowout preventers ("BOPs") are typically installed at the surface or on the sea floor in deep water drilling arrangements to effectively seal a wellbore until active measures can be taken to control the kick. BOPs may be activated so that kicks are adequately controlled and "circulated out" of the system. There are several types of BOPs, one common type of which is an annular blowout preventer.

Annular BOPs typically includes annular, elastomeric "packing units" that may be activated to encapsulate drillpipe and well tools to completely seal about a wellbore. In situations where no drillpipe or well tools are within the bore of the packing unit, the packing unit can be compressed to such an extent that the bore is entirely closed, acting as a valve on the wellbore. Typically, packing units are used in the case of sealing about a drillpipe, in which the packing unit can be quickly compressed, either manually or by machine, to effect a seal about the pipe to prevent a well from blowing out.

An example of an annular BOP having a packing unit is disclosed in U.S. Pat. No. 2,609,836, ("Knox") and incorporated herein by reference in its entirety, the assignee of the present invention. The packing unit includes a plurality of metal inserts embedded in an elastomeric body. Upon compression of the packing unit about a drillpipe, or upon itself, to seal against the wellbore pressure, the elastomeric body is squeezed radially inward, causing the metal inserts to move radially inward as well.

FIG. 1 is an example of a background art annular BOP 101 including a housing 102. The annular BOP 101 has a bore 120 extending therethrough and is disposed about a longitudinal axis 103. A packing unit 105 is disposed within the annular BOP 101 about the longitudinal axis 103. The packing unit 105 includes an elastomeric annular body 107. The packing unit 105 includes a bore 111 concentric with the bore 120 of the BOP 101.

The annular BOP 101 is actuated by fluid pumped into opening 113 of a piston chamber 112. The fluid applies pressure to a piston 117, which moves the piston 117 upward. As the piston 117 moves upward, the piston 117 translates force to the packing unit 105 through a wedge face 118. The force translated to the packing unit 105 from the wedge face 118 is directed upward toward a removable head 119 of the annular BOP 101, and inward toward the longitudinal axis 103 of the annular BOP 101. Because the packing unit 105 is retained against the removable head 119 of the annular BOP 101, the packing unit 105 does not displace upward from the force translated to the packing unit 105 from the piston 117. However, the packing unit 105 does displace inward from the translated force, which compresses the packing unit 105 toward the longitudinal axis 103 of the annular BOP 101. In the event a drill pipe 130 is located along the longitudinal axis 103, with sufficient radial compression, the packing unit 105 will seal about the drill pipe into a "closed position." The open position is shown in FIG. 2 while the closed position is shown in FIG. 3. In the event a drill pipe is not present, the packing unit 105, with sufficient radial compression, will completely seal the bore 111.

An example of the packing unit 105 used in an annular BOP 101 is shown in FIG. 4. As before, the packing unit 105 includes an elastomeric annular body 107 and may include a plurality of metallic inserts 109. The metallic inserts 109 may be distributed at equal radial distances from each other in the elastomeric annular body 107 of the packing unit 105. The packing unit 105 includes the bore 111.

The traditional packing units use for the elastomeric annular body nitrile rubber (NBR), which is the work horse in BOP applications because of its good physicals and oil resistance. However, NBR exhibits accelerated chemical degradation when exposed to zinc bromide ($ZnBr_2$) fluid, which is a component of the "mud" used in the wells for various purposes. An alternative to NBR is the Fluorocarbon Elastomer (FKM), which has better resistance to chemicals including $ZnBr_2$. However, FKM is not mechanically strong as the NBR and it is also expensive.

Another approach to improve the chemical degradation is to surface fluorinate NBR molded BOP parts. U.S. Pat. Nos. 5,214,102 and 5,274,049 (the contents of which are included by reference in their entirety herein) describe fluorination of molded elastomeric articles for reducing static and dynamic coefficients of friction and improving the wear life of the articles. Specifically, these two documents considered fluorinating elastomers as Kraton, Hytrel and other thermoplastic rubbers (a material that have both elastomeric and thermoplastic properties). Along the same lines, a paper entitled "Enhancement of the Chemical Resistance of Nitrile Rubber by Direct Fluorination" published in the Journal of Applied Polymer Science, Vol. 89, pages 971-979 (2003) (the entire content of which is incorporated in its entirety herein), investigates the addition of a fluorination layer on a nitrile rubber to prevent chemicals from penetrating inside the rubber and observing a retardation of loss of the mechanical properties.

However, the NBR with the surface fluorination is still not good enough for the present applications, especially that it was observed that cracks appear in the elastomeric material when the fluorination is performed. Accordingly, it would be desirable to provide systems and methods that avoid the afore-described problems and drawbacks.

SUMMARY

According to one exemplary embodiment, there is a packer unit to be used in an annular blowout preventer. The packer unit includes an elastomer body including a compound of a carboxylated nitrile rubber (XNBR) base polymer having a polymer chain; and a quantity of fluorine atoms attached to the polymer chain. The compound includes between 50 and 60% XNBR, between 25 to 35% carbon black, and the rest includes other materials, and the quantity of fluorine atoms displaces at least an equal quantity of hydrogen atoms from the polymer chain when the elastomer body is fluorinated.

According to another exemplary embodiment, there is an annular blowout preventer to be installed on a well. The annular blowout preventer includes a housing having a bore extending therethrough about a longitudinal axis; a packing unit disposed within the housing about the longitudinal axis; and a piston configured to move along the longitudinal axis and to squeeze the packing unit towards the longitudinal axis. The packing unit includes an elastomer body including a compound of a carboxylated nitrile rubber (XNBR) base polymer having a polymer chain, and a quantity of fluorine atoms attached to the polymer chain. The compound includes between 50 and 60% XNBR, between 25 to 35% carbon black, and the rest includes other materials, and the quantity of fluorine atoms displaces at least an equal quantity of hydrogen atoms from the polymer chain when the elastomer body is fluorinated.

According to yet another exemplary embodiment, there is a device that includes an elastomer body including a compound of a carboxylated nitrile rubber (XNBR) base polymer having a polymer chain; and a quantity of fluorine atoms attached to the polymer chain. The compound includes between 50 and 60% XNBR, between 25 to 35% carbon black, and the rest includes other materials, and the quantity of fluorine atoms displaces at least an equal quantity of hydrogen atoms from the polymer chain when the elastomer body is fluorinated.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
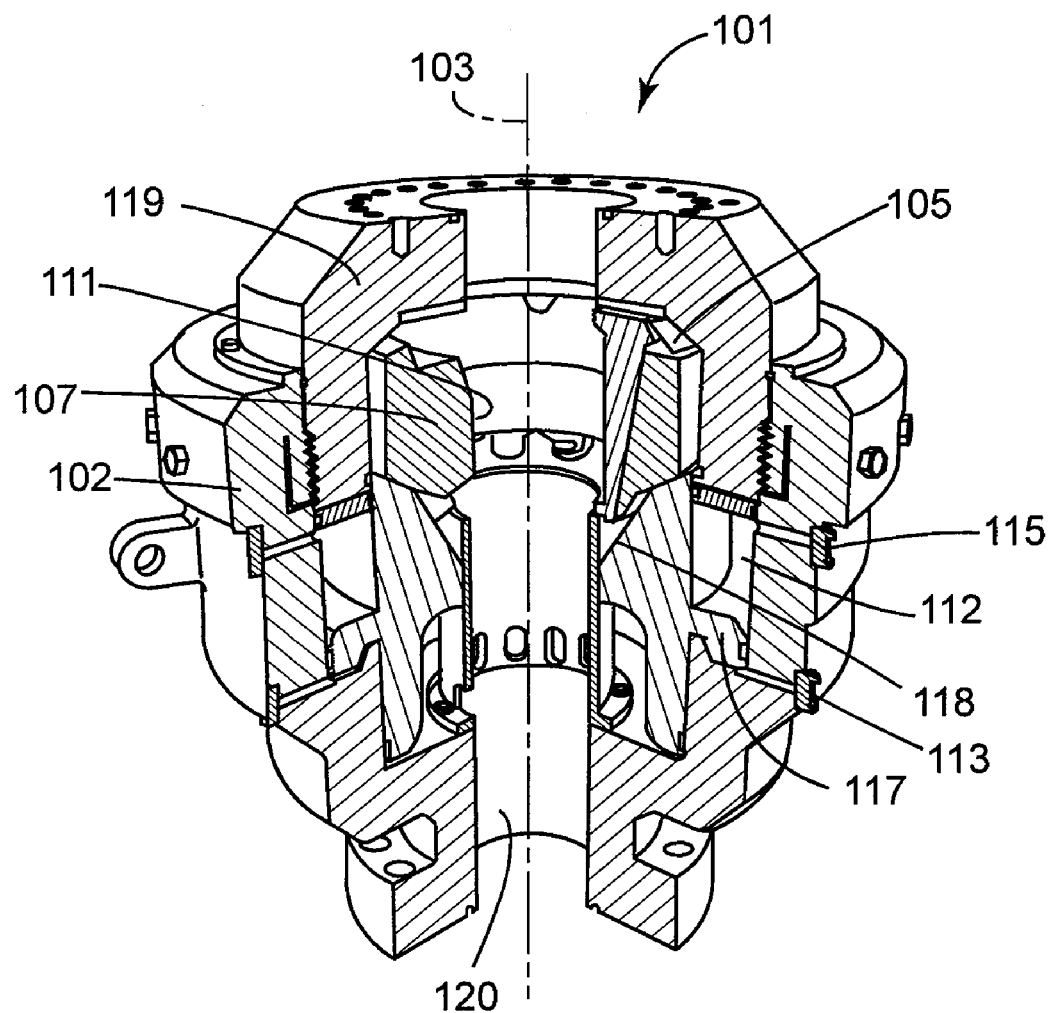
FIG. 1 is a schematic diagram of a conventional annular blowout preventer.
Figure 2:
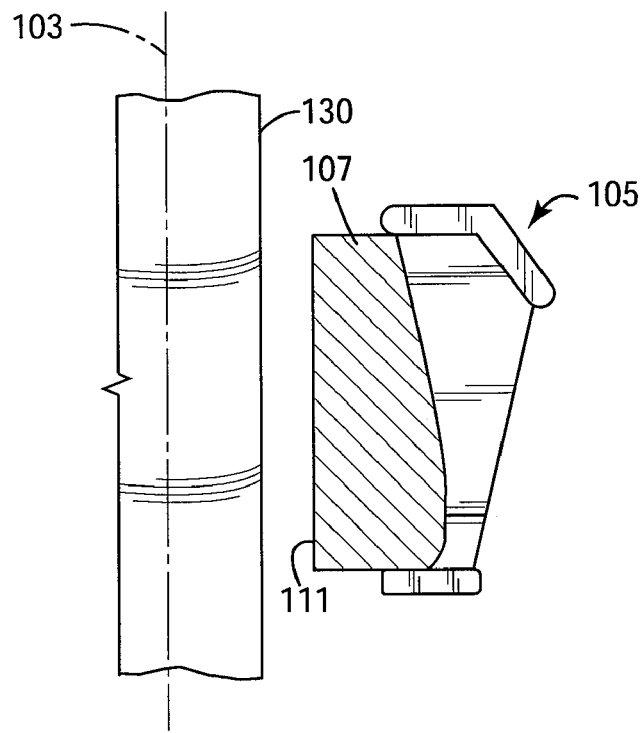
FIG. 2 is a schematic diagram of a section of a packing unit in an open position in an annular blowout preventer.
Figure 3:
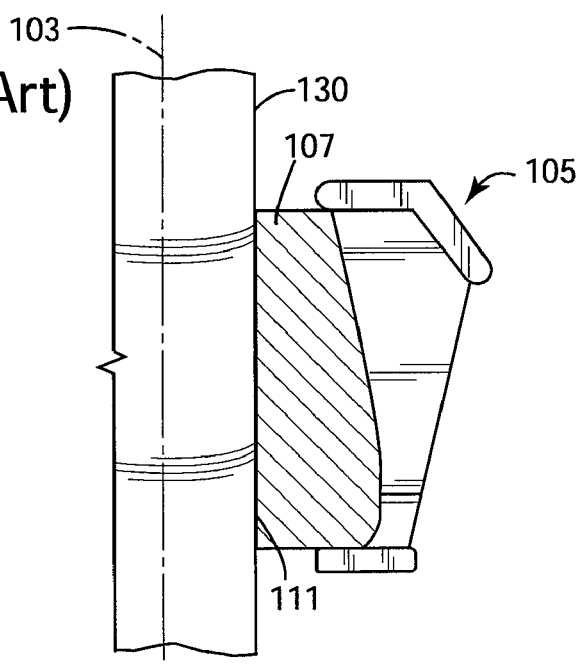
FIG. 3 is a schematic diagram of a section of a packing unit in a closed position in an annular blowout preventer.
Figure 4:
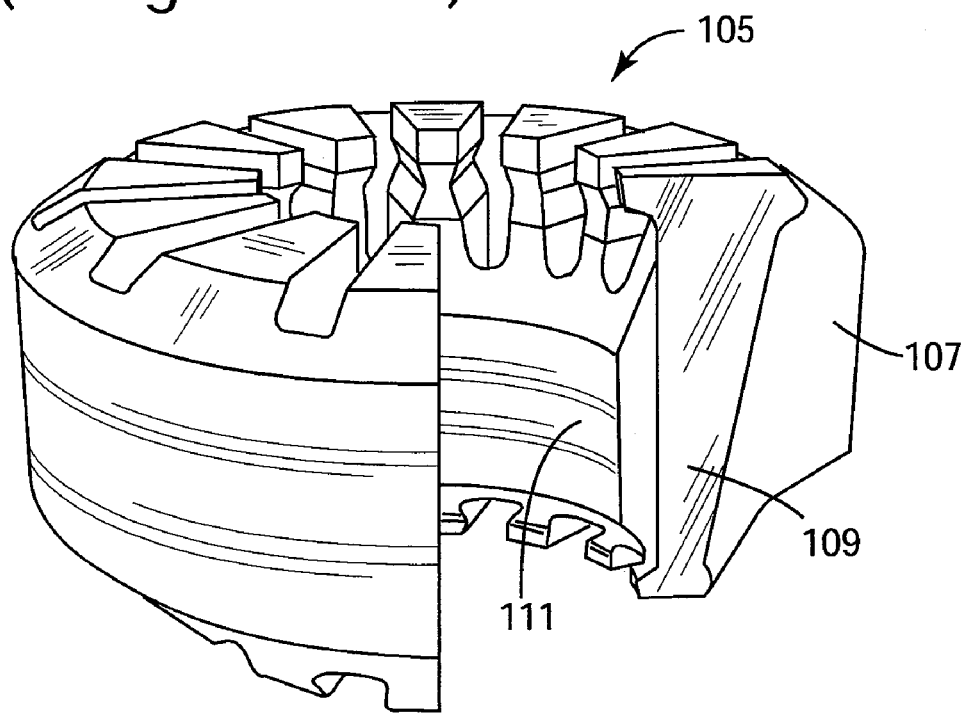
FIG. 4 is a schematic diagram of a packing unit.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of annular BOP systems. However, the embodiments to be discussed next are not limited to these systems, but may be applied to other systems that require a certain elastomer with predetermined chemical and mechanical characteristics.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, various potential materials for making an elastomeric body of a packing unit of an annular BOP system have been surface fluorinated and then tested for chemical and mechanical features. The treated material is compared to a baseline material. The traditional NBR polymeric matrix is used as the baseline material. Also tested is the FKM compound discussed above. Other tested materials are compounds based on the carboxylated nitrile rubber (XNBR) and the hydrogenated nitrile rubber (HNBR).

A brief discussion of the structure of these materials is now provided. NBR is actually a complex family of unsaturated copolymers of acrylonitrile and butadiene. By selecting an elastomer with the appropriate acrylonitrile content in balance with other properties, the rubber compounder can use NBR in a wide variety of application areas requiring oil, fuel, and chemical resistance.

Most NBR manufacturers make at least 20 conventional elastomer variations. NBR producers vary polymerization temperatures to make "hot" and "cold" polymers. Acrylonitrile (ACN) and butadiene (BD) ratios are varied for specific oil and fuel resistance and low temperature requirements. Specialty NBR polymers which contain a third monomer (e.g., divinyl benzene, methacrylic acid) are also offered. Some NBR elastomers are hydrogenated to reduce the chemical reactivity of the polymer backbone, improving heat resistance (e.g., HNBR). Each modification determines uniquely different properties.

Addition of carboxylic acid groups to the NBR polymer's backbone (XNBR) may alter processing and curing properties. The result is a polymer matrix with increased strength, measured by improved tensile, tear, modulus and abrasion resistance. The negative effects include reduction in compression set, water resistance, resilience and some low-temperature properties.

From this description of the NBR, HNBR, and XNBR it is noted that these families include a large number of products having different properties. Thus, finding one or more components that after fluorination exhibit more desirable properties is not obvious or simply.

As zinc bromide brines have been used in some of the drilling muds and completion solutions for increasing fluid densities, the operators of the wells have observed that the traditional nitrile elastomers found in the annular BOPs shows adverse effects to the zinc bromide fluids.

Three BOP nitrile compounds (see Table 1) were fluorinated at three levels, i.e., levels L (low), M (medium), and H (high). The fluorination levels are characterized by, for example, a resultant concentration of fluorine atoms on the fluorinated sample surfaces, in terms of a fluorine/carbon ratio. This ratio may be determined by SEM-EDS (Scanning Electron Microscopy and Energy Dispersive System). For a set of samples fluorinated at the three levels L, M, and H, the following ratios of fluorine to carbon atoms were determined: 0.10 to 0.18 for level L, 0.18 to 0.26 for level M, and 0.26 to 0.34 for level H. The fluorinated samples were tested side by side with their corresponding un-fluorinated controls and an FKM compound. The fluid compatibility tests were carried out by soaking the samples in $ZnBr_2$ brine as well as diesel at the elevated temperature of 185° F. for a number of days (e.g., seven days) as discussed later.

TABLE 1

| Compound | Base Polymer | Carbon Black (%) |
|---|---|---|
| CP-N | NBR | 20-40 |
| CP-X | XNBR | 20-40 |
| CP-H | HNBR | 20-40 |
| CP-F | FKM | 15-35 |

The components of the NBR, XNBR and HNBR compounds were obtained from commercially available production batches. For example, the CP-X component may include the base polymer (XNBR), carbon black, plasticizers, antioxidants, process aids, ZnO based materials, curatives (e.g., sulfur and accelerators), etc. In one exemplary embodiment, a sample of CP-X includes the above noted components in the following quantities: 100, 52, 5, 3, 4.2, 10, and 1.98 respectively. For this sample, the amount of XNBR has been considered to be 100 and the remaining components are expressed as (mass or weight) percentages relative to the XNBR amount (100). According to another exemplary embodiment, the amount of polymer is between 50 and 60%, the amount of carbon black is between 25 and 35%, and all the other components account together for the remaining percentage of the sample. In one application, the amount of polymer is 57%, the carbon black is 30% and the other components account for 13%. It is understood in the following that the CP-X stands for any of the above noted compositions. The samples were compression molded into standard ASTM sheets (6×6×0.08 in) according to ASTM D3182. The cure time and temperature were, e.g., 15 minutes at 320° F. The tensile, tear, and swelling samples were cut from the sheets by ASTM dies before fluorination to assure the cutting edges having been fluorinated during soaking tests. Fluorination was conducted under various fluorination conditions, such as time, temperature, and fluorine concentration. Levels L, M and H were applied by Fluoro-Seal Inc. of Houston, Tex. The physical tests such as hardness, tensile and tear were performed on samples of the following states and the percent changes were determined as described below:

Group-1: Un-fluorinated samples (Control or Level-0);

Group-2: Fluorinated samples (Level-L, Level-M, and Level-H). Levels-L, -M, and -H correspond to Levels 2, 5, and 9 of Fluoro-Seal.

Percent changes of Group-2 over Group-1 were calculated to determine the effect of fluorination on elastomer physicals.

Group-3: Fluid soaked samples of "Control" and Levels L, M, and H.

The samples of the Group-3 were soaked into the zinc bromide solution as well as the off-road #2 diesel for about 168 hours (7 days) at the elevated temperature of about 185° F. (85° C.). At the end of soaking, the soaked specimens were removed from the fluids, and the physical tests were carried out on these soaked specimens in ambient following the same procedure as applied on Groups 1 and 2.

Percent changes were calculated for the soaked (Group-3) samples over the unsoaked (Groups-1 and -2) samples to determine the fluid compatibility. FKM compound CP-F was tested in original and soaked states. The ASTM standards applied for the physical tests are listed in Table 2.

TABLE 2

| Test | ASTM # |
|---|---|
| Hardness | D 2240 |
| Tensile | D 412 |
| Tear | D 624 |
| Volume Swell | D 471 |

Anhydrous $ZnBr_2$ and deionized water were obtained from Alfa Aesar Chemical Company. The $ZnBr_2$ brine was made by dissolving 2.2 kg of $ZnBr_2$ into 1.0 liter of deionized water (18.65 pounds $ZnBr_2$ per 1.0 gallon water). Fourier Transform Infrared (FTIR) tests (to be discussed later) were carried out using an ATR-FTIR spectrometer. Copies of the spectra are shown in the figures. The surfaces of the high-level fluorinated samples were observed via the Caltex 3D digital video microscope system.

Table 3 shows the physical properties of un-fluorinated (control) and fluorinated (Levels-L, M and H) CP-N (NBR), CP-X (XNBR) and CP-H (HNBR) compounds. The percent changes of physical properties after fluorination over the original ones are illustrated in this table. The physical properties of FKM compound CP-F are also listed in Table 3 for comparison. The hardness changes after fluorination for CP-N and CP-H are within +/−2 points, which can be considered small. For CP-X, the fluorination of Levels-M and H made the samples softer (changing −5 points) than that of Level-L (−2 point). The losses of tensile and elongation for Level-L samples of CP-N and CP-H are about 30%, which increases to over 50% for Levels-M and H. In other words, the fluorination of medium and high levels made CP-N and CP-H lose more than half of tensile strength and ultimate elongation.

TABLE 3

Physical properties of un-fluorinated (control) and fluorinated (Levels-L, M & H) NBR, XNBR & HNBR compounds, and FKM compound. Percent changes are based on the un-fluorinated (control) compounds.

| Percent Change after Fluorination | CP-N (NBR) | | | | CP-X (XNBR) | | | | CP-H (HNBR) | | | | CP-F |
|---|---|---|---|---|---|---|---|---|---|---|---|---|---|
| | Control | L-L | L-M | L-H | Control | L-L | L-M | L-H | Control | L-L | L-M | L-H | FKM |
| Tensile (psi) | 3675 | 2479 | 1201 | 1068 | 3291 | 3234 | 2765 | 2872 | 3519 | 2321 | 1588 | 1368 | 3526 |
| Change in Tensile (%) | | −33 | −67 | −71 | | −2 | −16 | −13 | | −34 | −55 | −61 | |
| Elongation (%) | 584 | 358 | 221 | 212 | 368 | 419 | 445 | 470 | 708 | 620 | 375 | 347 | 305 |
| Change in Elong. (%) | | −39 | −62 | −64 | | 14 | 21 | 28 | | −12 | −47 | −51 | |

TABLE 3-continued

Physical properties of un-fluorinated (control) and fluorinated (Levels-L, M & H) NBR, XNBR & HNBR compounds, and FKM compound. Percent changes are based on the un-fluorinated (control) compounds.

| Percent Change after Fluorination | CP-N (NBR) | | | | CP-X (XNBR) | | | | CP-H (HNBR) | | | | CP-F |
|---|---|---|---|---|---|---|---|---|---|---|---|---|---|
| | Control | L-L | L-M | L-H | Control | L-L | L-M | L-H | Control | L-L | L-M | L-H | FKM |
| 100 Modulus (psi) | 477 | 544 | 591 | 636 | 921 | 846 | 640 | 648 | 318 | 350 | 390 | 371 | 721 |
| Change in 100 Mod (%) | | 14 | 24 | 33 | | −8 | −31 | −30 | | 10 | 23 | 17 | |
| 200 Modulus (psi) | 1173 | 1295 | 1157 | 1054 | 1844 | 1677 | 1259 | 1268 | 557 | 614 | 761 | 728 | 2153 |
| Change in 200 Mod (%) | | 10 | −1 | −10 | | −9 | −32 | −31 | | 1 | 4 | 3 | |
| 300 Modulus (psi) | 2030 | 2133 | | | 2703 | 2455 | 1883 | 1886 | 912 | 981 | 1277 | 1223 | 3476 |
| Change in 300 Mod (%) | | 5 | | | | −9 | −30 | −30 | | 8 | 40 | 34 | |
| Hardness (Shore-A) | 80 | 80 | 78 | 78 | 85 | 83 | 80 | 80 | 75 | 77 | 74 | 73 | 79 |
| Change in Hardness (Pts.) | | 0 | −2 | −2 | | −2 | −5 | −5 | | 2 | −1 | −2 | |
| Tear (lb. in) | 346 | 295 | 254 | 208 | 256 | 452 | 383 | 387 | 395 | 333 | 200 | 265 | 176 |
| Change in Tear (%) | | −15 | −27 | −40 | | 77 | 50 | 51 | | −16 | −49 | −33 | |

For CP-X, fluorination decreases tensile strength but increases elongation, while either of these changes is less than 30%. For CP-N and CP-H, fluorination increases their 100 modulus (this is a known test that deforms the sample by 100% of its length). However, for CP-X, 100 modulus decrease by fluorination, and the reduction is more significant by Levels M and H. The fluorination increases the tear strength for CP-X. For CP-N and CP-H after fluorination, the tear strength decreased. When compared with CP-N and CP-H, the effects of fluorination on elastomer physicals for CP-X are more desirable and more positive for potential BOP applications, especially on the ultimate properties like tensile, elongation and tear.

Table 4 lists the physical properties of un-fluorinated (control) and fluorinated (levels L, M and H) samples after being soaked in zinc bromide solution for between 100 and 200 hours (e.g., 168 hours at 185° F. (85° C.). The percent changes are calculated based on un-soaked data listed in Table 3. FKM data are listed at the very right column of each table for comparison.

TABLE 4

Physical properties of un-fluorinated (control) and fluorinated (levels-L, M & H) NBR, XNBR & HNBR compounds, and FKM compound after soaking in ZnBr$_2$ for 7 days @ 85° C. Percent changes are based on un-soaked data listed in Table 3.

| Soaking in ZnBr$_2$ for 7 Days @ 85° C. | CP-N (NBR) | | | | CP-X (XNBR) | | | | CP-H (HNBR) | | | | CP-F |
|---|---|---|---|---|---|---|---|---|---|---|---|---|---|
| | Control | L-L | L-M | L-H | Control | L-L | L-M | L-H | Control | L-L | L-M | L-H | FKM |
| Tensile (psi) | 3404 | 2404 | 1074 | 997 | 3159 | 2608 | 2252 | 2379 | 4267 | 2824 | 1422 | 1260 | 3568 |
| Change in Tensile (%) | −7 | −3 | −11 | −7 | −4 | −19 | −19 | −17 | 21 | 22 | −10 | −8 | 1 |
| Elongation (%) | 183 | 135 | 131 | 154 | 257 | 242 | 263 | 282 | 342 | 233 | 227 | 267 | 295 |
| Change in Elong. (%) | −69 | −62 | −41 | −27 | −30 | −42 | −41 | −40 | −52 | −62 | −39 | −23 | −3 |
| 100 Modulus (psi) | 2237 | 1789 | 890 | 758 | 2013 | 1131 | 915 | 884 | 1351 | 1175 | 619 | 473 | 703 |
| Change in 100 Mod (%) | 369 | 229 | 51 | 19 | 119 | 34 | 43 | 36 | 325 | 236 | 59 | 27 | −2 |
| 200 Modulus (psi) | | | | | 2852 | 2226 | 1805 | 1772 | 2934 | 2396 | 1264 | 973 | 2198 |
| Change in 200 Mod (%) | | | | | 55 | 33 | 43 | 40 | 427 | 290 | 66 | 34 | 2 |
| 300 Modulus (psi) | | | | | | | | | 3939 | | | | |
| Change in 300 Mod (%) | | | | | | | | | 332 | | | | |
| Hardness (Shore-A) | 91 | 90 | 82 | 80 | 95 | 86 | 84 | 83 | 88 | 86 | 77 | 75 | 81 |

TABLE 4-continued

Physical properties of un-fluorinated (control) and fluorinated (levels-L, M & H) NBR, XNBR & HNBR compounds, and FKM compound after soaking in ZnBr$_2$ for 7 days @ 85° C. Percent changes are based on un-soaked data listed in Table 3.

| Soaking in ZnBr$_2$ for 7 Days | CP-N (NBR) | | | | CP-X (XNBR) | | | | CP-H (HNBR) | | | | CP-F |
|---|---|---|---|---|---|---|---|---|---|---|---|---|---|
| @ 85° C. | Control | L-L | L-M | L-H | Control | L-L | L-M | L-H | Control | L-L | L-M | L-H | FKM |
| Change in Hardness (Pts.) | 11 | 10 | 4 | 2 | 10 | 3 | 4 | 3 | 13 | 9 | 3 | 2 | 2 |
| Tear (lb. in) | 307 | 212 | 144 | 165 | 393 | 240 | 242 | 246 | 356 | 265 | 191 | 186 | 160 |
| Change in Tear (%) | −11 | −28 | −43 | −21 | 54 | −47 | −37 | −36 | −10 | −20 | −5 | −30 | −9 |
| Volume Change (%) | 9.35 | 6.50 | 1.06 | 0.08 | 6.57 | 2.53 | 1.87 | 1.79 | 17.51 | 10.83 | 2.13 | 0.05 | 1.02 |

After soaking in the ZnBr$_2$ brine, the hardness of the un-fluorinated nitriles increased 10 points or more. Fluorination of levels L, M and H reduced the hardness Shore-A change of CP-X to 3 or 4 points. The low level fluorination improved the hardness retention for CP-N and CP-H slightly. However, the levels M and H reduced the Shore-A changes of CP-N and CP-H to 2 to 4 points. For the un-fluorinated samples (L-0), ZnBr$_2$ brine caused a negligible change on the tensile of CP-N and CP-X, and increased the tensile of CP-H. For all of the three un-fluorinated nitriles, the ZnBr$_2$ brine reduced their elongations and increased their moduli.

The retention of tensile, the reduction of elongation and the increase of modulus made the samples more plastic-like, or in other words, reduced their elasticity, which is undesirable. These tension results are consistent with the hardness results, that is, ZnBr$_2$ brine aging hardens or stiffens the unfluorinated nitrile samples (NBR, XNBR or HNBR). The loss of elasticity is a major root cause for a nitrile BOP packing unit to fail in zinc bromide environment, especially at elevated temperatures.

Comparing the elongation after soaking in ZnBr$_2$ brine between un-fluorinated (L-0) and fluorinated (Levels-L, M and H) samples, there is no significant difference. For CP-N and CP-H, the percent change of elongation after ZnBr$_2$ soaking reduced with fluorination, because the fluorination had reduced the original elongation, or in other words, had lowered the baselines.

The 100% modulus change for un-fluorinated CP-N and CP-H are as high as over 300%. The low level fluorination reduced these changes but they are still over 200%. The medium level fluorination brought these percent changes down to 50% and the high level further decreased them to around 20%. The un-fluorinated CP-X has less percent change of modulus than its counterparts of CP-N and CP-H, but it is still as high as over 100%. The fluorination brought these changes to lower than 50%, while there is no significant difference among levels L, M, and H.

The effects of ZnBr$_2$ soaking on modulus are consistent with those on hardness. As both Shore-A hardness and tensile modulus represent the stiffness, the results in Table 4 indicate that ZnBr$_2$ soaking at the elevated temperature made the nitriles including NBR, XNBR and HNBR compounds harder or brittle, which is one of the major root causes of BOP elastomer failure in the zinc bromide environment. The surface fluorination improves the nitriles' resistance to zinc bromide brines, especially the capability of keeping their flexibility.

The tear strength of the samples was reduced after ZnBr$_2$ soaking. The tear in ZnBr$_2$ is not improved by fluorination. The trend of the reduction in tear strength with increase of fluorination levels for all the three nitriles is very similar to that in tensile strength. Table 4 shows the swelling volume changes after ZnBr$_2$ soaking. The fluorination reduced volume swelling for all of the three tested compounds. The reduction of volume swelling improves with the increase of fluorination level, especially for CP-N and CP-H. Overall, as shown in Table 4, the ZnBr$_2$ soaking had almost no effect on FKM compound CP-F. The change of any tested physical property for FKM after ZnBr$_2$ soaking is negligible.

Table 5 lists the physical properties of un-fluorinated (control) and fluorinated (levels L, M, and H) samples after soaking in #2 diesel for between 100 and 200 hours (e.g., 168 hours at 185° F. (85° C.)). The soaking in diesel is a standard test performed on an elastomer in the oil and gas field. Unlike ZnBr$_2$ hardening of the nitriles, diesel softens the nitriles. While ZnBr$_2$ brine chemically attacks nitriles so that the elastomers are hardened due to oxidation, the diesel is acting more physically like a plasticizer. Thus it is understandable the tensile and tear strengths decreased after diesel soaking and modulus decreased or remained nearly unchanged. Elongation decreased but the loss is not as severe as in ZnBr$_2$.

TABLE 5

Physical properties of un-fluorinated (control) and fluorinated (levels-L, M & H) NBR, XNBR & HNBR compounds, and FKM compound after soaking in diesel for 7 days @ 85° C. Percent changes are based on un-soaked data listed in Table 3.

| Soaking in Diesel for 7 Days | CP-N (NBR) | | | | CP-X (XNBR) | | | | CP-H (HNBR) | | | | CP-F |
|---|---|---|---|---|---|---|---|---|---|---|---|---|---|
| @ 85° C. | Control | L-L | L-M | L-H | Control | L-L | L-M | L-H | Control | L-L | L-M | L-H | FKM |
| Tensile (psi) | 3139 | 1918 | 763 | 794 | 3274 | 2481 | 2316 | 2262 | 2742 | 2034 | 1174 | 1101 | 3322 |
| Change in Tensile (%) | −15 | −23 | −36 | −26 | −1 | −23 | −16 | −21 | −22 | −12 | −26 | −20 | −6 |

TABLE 5-continued

Physical properties of un-fluorinated (control) and fluorinated (levels-L, M & H) NBR, XNBR & HNBR compounds, and FKM compound after soaking in diesel for 7 days @ 85° C. Percent changes are based on un-soaked data listed in Table 3.

| Soaking in Diesel for 7 Days @ 85° C. | CP-N (NBR) | | | | CP-X (XNBR) | | | | CP-H (HNBR) | | | | CP-F |
|---|---|---|---|---|---|---|---|---|---|---|---|---|---|
| | Control | L-L | L-M | L-H | Control | L-L | L-M | L-H | Control | L-L | L-M | L-H | FKM |
| Elongation (%) | 434 | 269 | 149 | 141 | 304 | 289 | 344 | 360 | 701 | 715 | 329 | 311 | 382 |
| Change in Elong. (%) | −26 | −25 | −33 | −33 | −17 | −31 | −23 | −23 | −1 | 15 | −12 | −10 | 25 |
| 100 Modulus (psi) | 434 | 492 | 602 | 652 | 910 | 715 | 553 | 492 | 224 | 250 | 324 | 339 | 496 |
| Change in 100 Mod (%) | −9 | −10 | 2 | 3 | −1 | −15 | −14 | −24 | −30 | −29 | −17 | −9 | −31 |
| 200 Modulus (psi) | 1220 | 1363 | | | 2062 | 1644 | 1299 | 1182 | 445 | 495 | 679 | 698 | 1827 |
| Change in 200 Mod (%) | 4 | 5 | | | 12 | −2 | 3 | −7 | −20 | −19 | −11 | −4 | −15 |
| 300 Modulus (psi) | 2202 | | | | 2720 | 2521 | 2004 | 1857 | 762 | 824 | 1103 | 1090 | 2874 |
| Change in 300 Mod (%) | 8 | | | | 1 | 3 | 6 | −2 | −16 | −16 | −14 | −11 | −17 |
| Hardness (Shore-A) | 66 | 67 | 69 | 69 | 69 | 75 | 69 | 69 | 65 | 64 | 64 | 66 | 75 |
| Change in Hardness (Pts.) | −14 | −13 | −9 | −9 | −16 | −8 | −11 | −11 | −10 | −13 | −10 | −7 | −4 |
| Tear (lb.in) | 237 | 172 | 133 | 126 | 210 | 184 | 189 | 196 | 275 | 226 | 177 | 216 | 147 |
| Change in Tear (%) | −32 | −42 | −48 | −39 | −18 | −59 | −51 | −49 | −30 | −32 | −12 | −18 | −16 |
| Volume Change (%) | 14.33 | 16.10 | 12.6 | 10.89 | 19.13 | 19.13 | 20.2 | 20.44 | 16.27 | 16.27 | 12.48 | 5.66 | 2.99 |

Table 5 shows the volume change (%) after diesel soaking. For CP-X, the difference of volume change between the samples with and without fluorination is very small. For CP-N and CP-H, the fluorination of levels M and H significantly decreased volume swelling in diesel, which is consistent with the better retention of hardness and modulus. However, this did not translate into the retention of ultimate properties-tensile, elongation and tear.

The volume change of CP-F in diesel is 2.99%, which is much lower than the tested nitriles, either un-fluorinated or fluorinated. However, the much less swelling of FKM in diesel does not bring much of benefits to the retention of physical properties, although the reduced swelling of FKM in zinc bromide brine does improve its properties. Meanwhile, fluorination of nitriles enhances their resistance to zinc bromide brine but not to diesel.

Fluorination of polyolefin such as HDPE containers has been successfully commercialized to enhance their oil/fuel resistance. However, fluorination of nitriles is not able to provide significant improvement on diesel resistance as the controlled baselines are un-fluorinated nitriles, which are inherently oil/fuel resistant elastomers.

Figure 5:
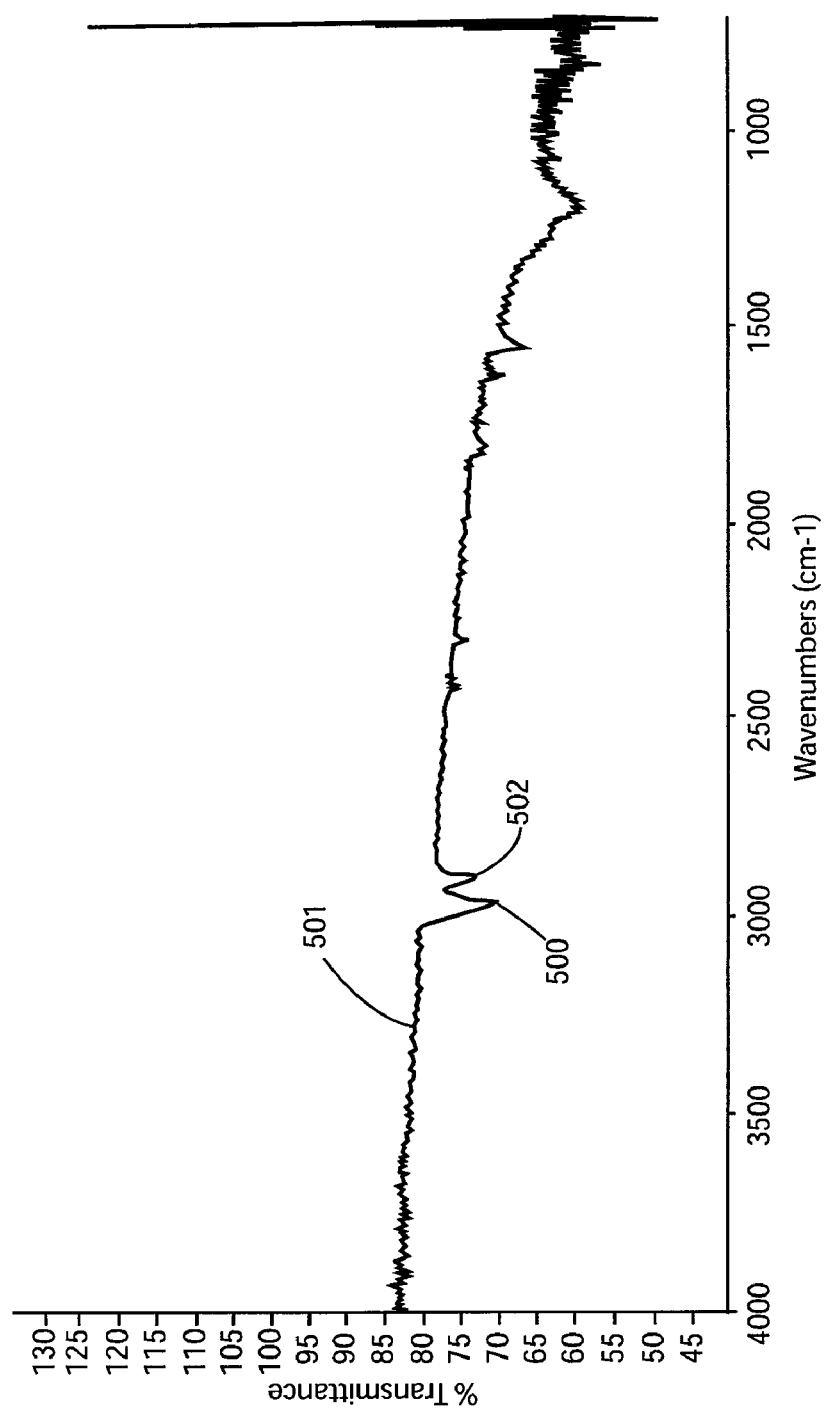
FIGS. 5 to 8 illustrate infrared spectrums for un-fluorinated samples of CP-N, CP-X, CP-H and CP-F, respectively, according to exemplary embodiments.
Figure 6:
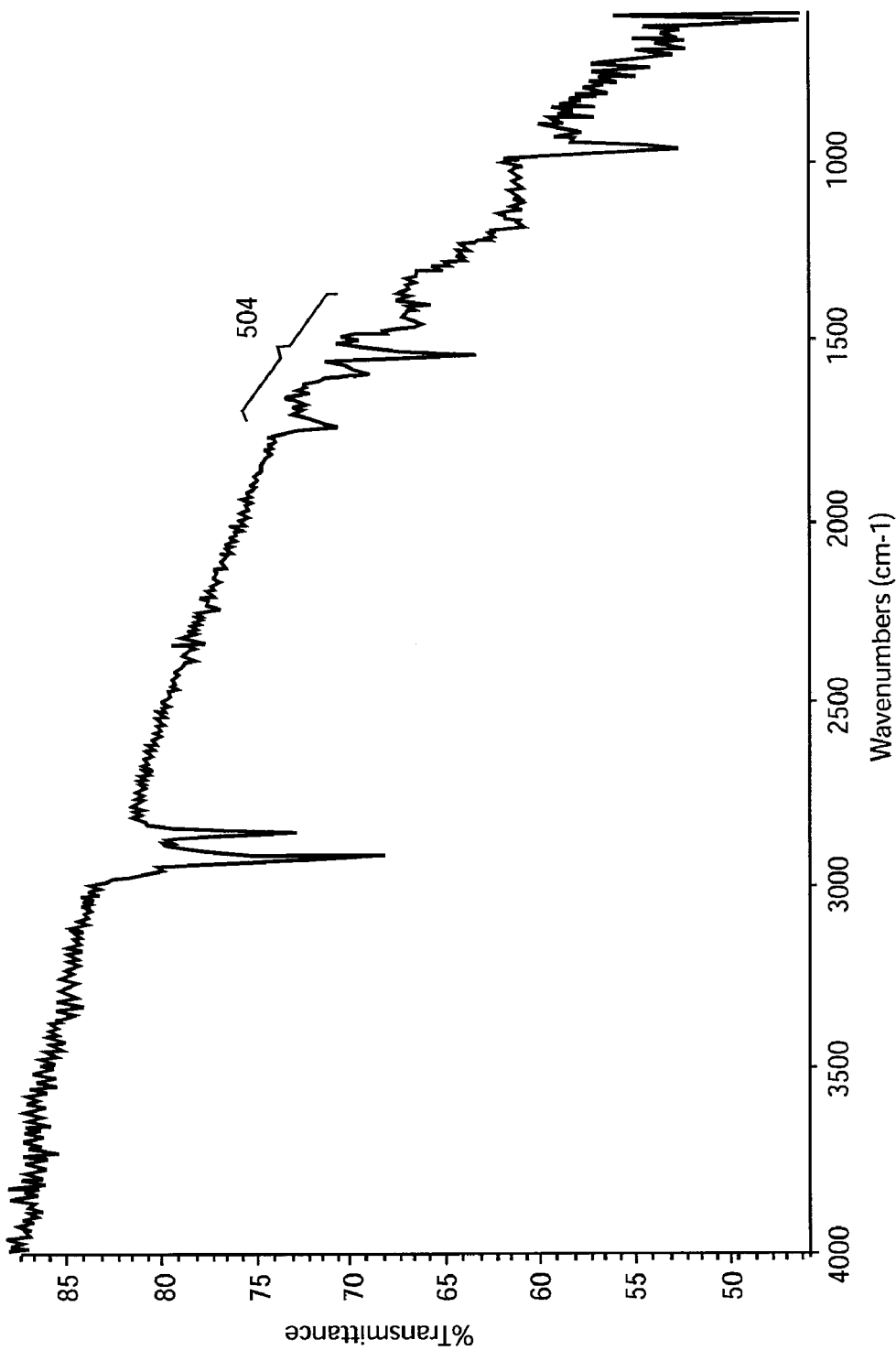
Figure 7:
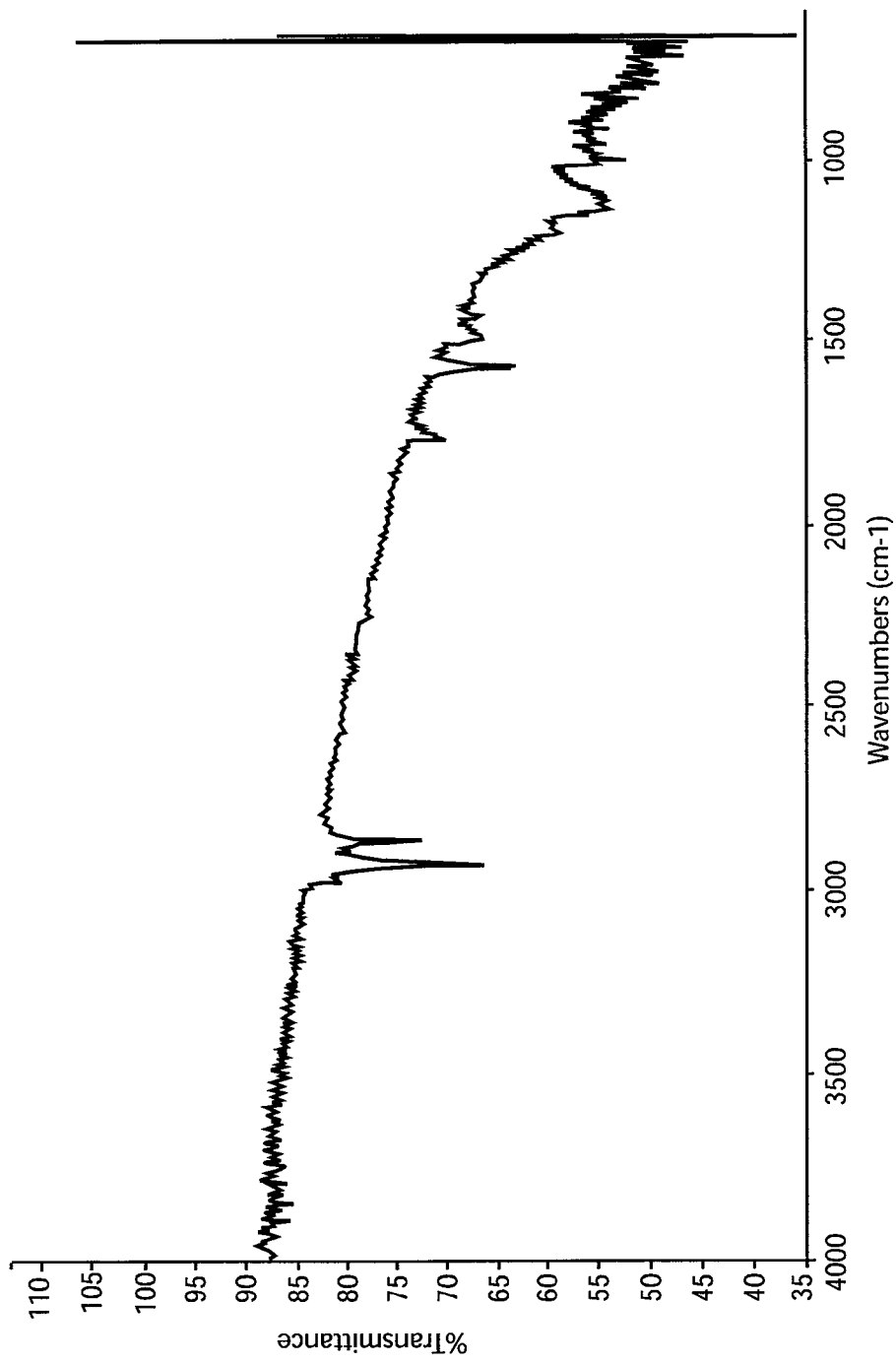

An FTIR analysis has been performed to confirm the presence of flour atoms in the investigated samples. FIGS. 5 through 7 show the FTIR spectra of un-fluorinated CP-N, CP-X and CP-H, respectively. The IR bands in these spectra are typical ones seen in a spectrum of NBR, XNBR or HNBR compounds. For example, band 501 shown in FIG. 5 includes two peaks 500 and 502. These peaks correspond to certain chemical elements and the size of the peak is related to the amount of the corresponding chemical component. In all of the three spectra in FIGS. 5-7, the 3000-2850 cm$^{-1}$ double bands are due to C—H bonds. Around 2235 cm$^{-1}$ is a weak band which is from CN nitrile triple bonds. The bands of 1670-1640 cm$^{-1}$ indicate the C=C bonds, which are from carbon-carbon double bond residuals of uncross-linked spots. CP-X has a unique band 504 at 1730-1697 cm$^{-1}$ which is characteristic of its carboxylic groups as CP-X is a XNBR (carboxylated nitrile rubber) compound.

Figure 8:
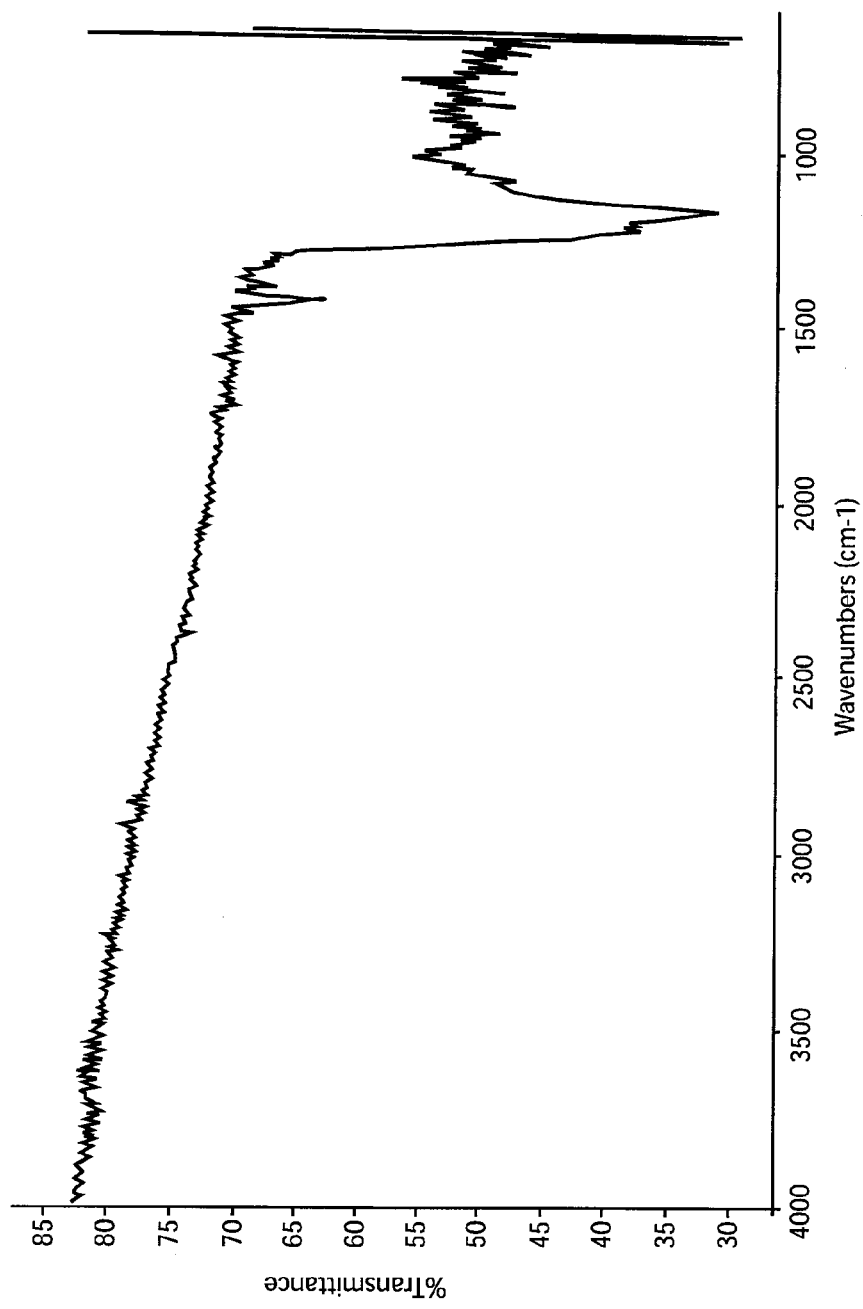
Figure 9:
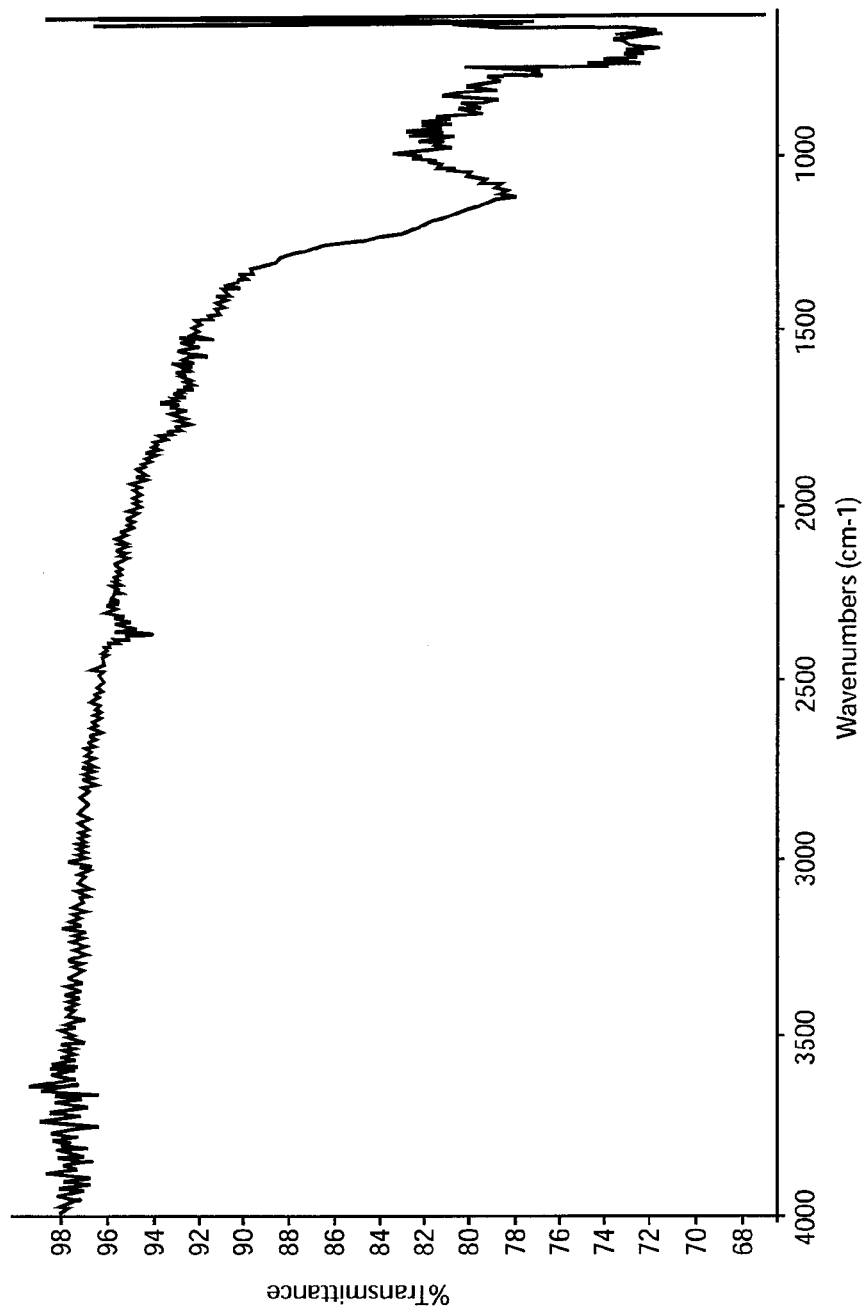
FIGS. 9-11 illustrate infrared spectrums for fluorinated samples of CP-N, levels L, M, and H respectively, according to exemplary embodiments.
Figure 10:
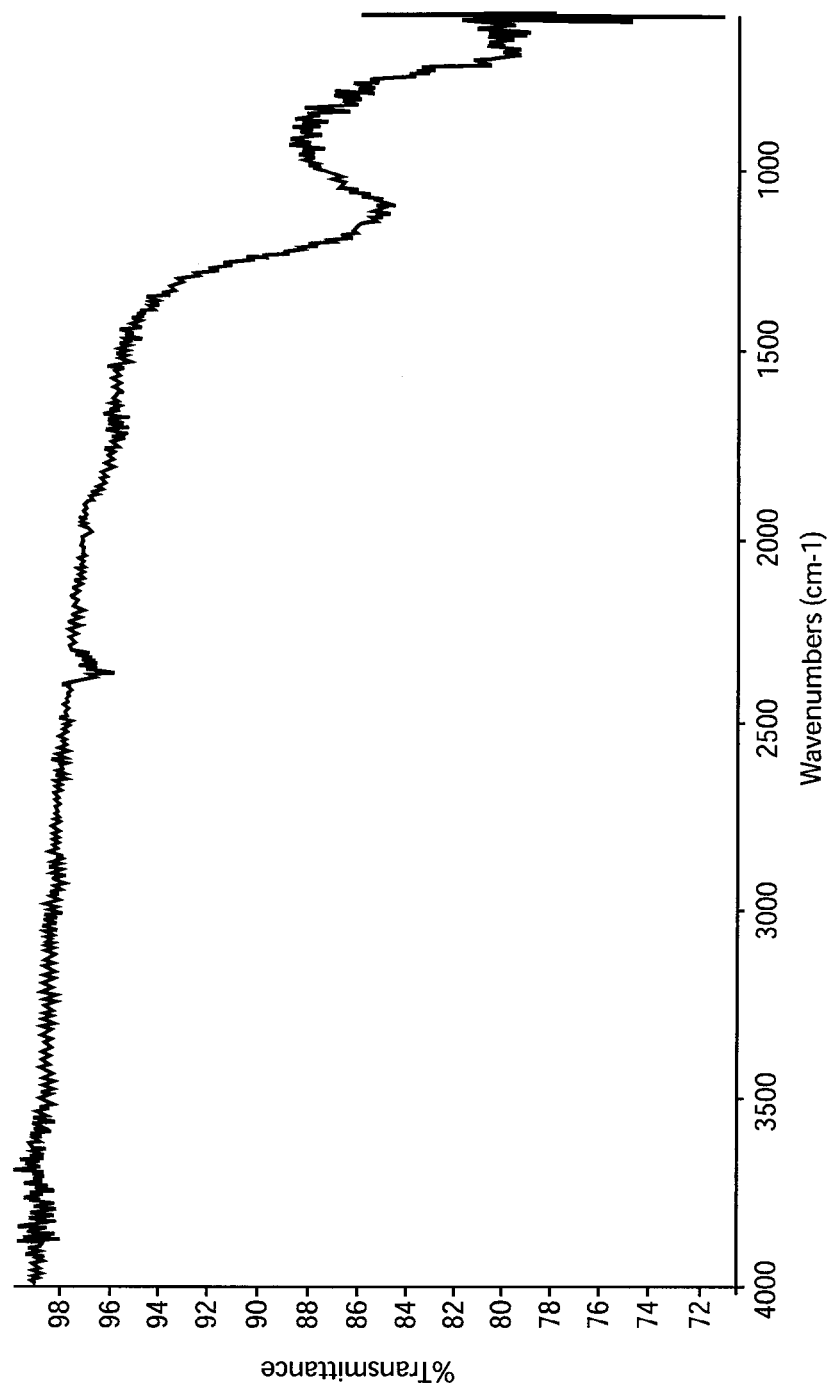
Figure 11:
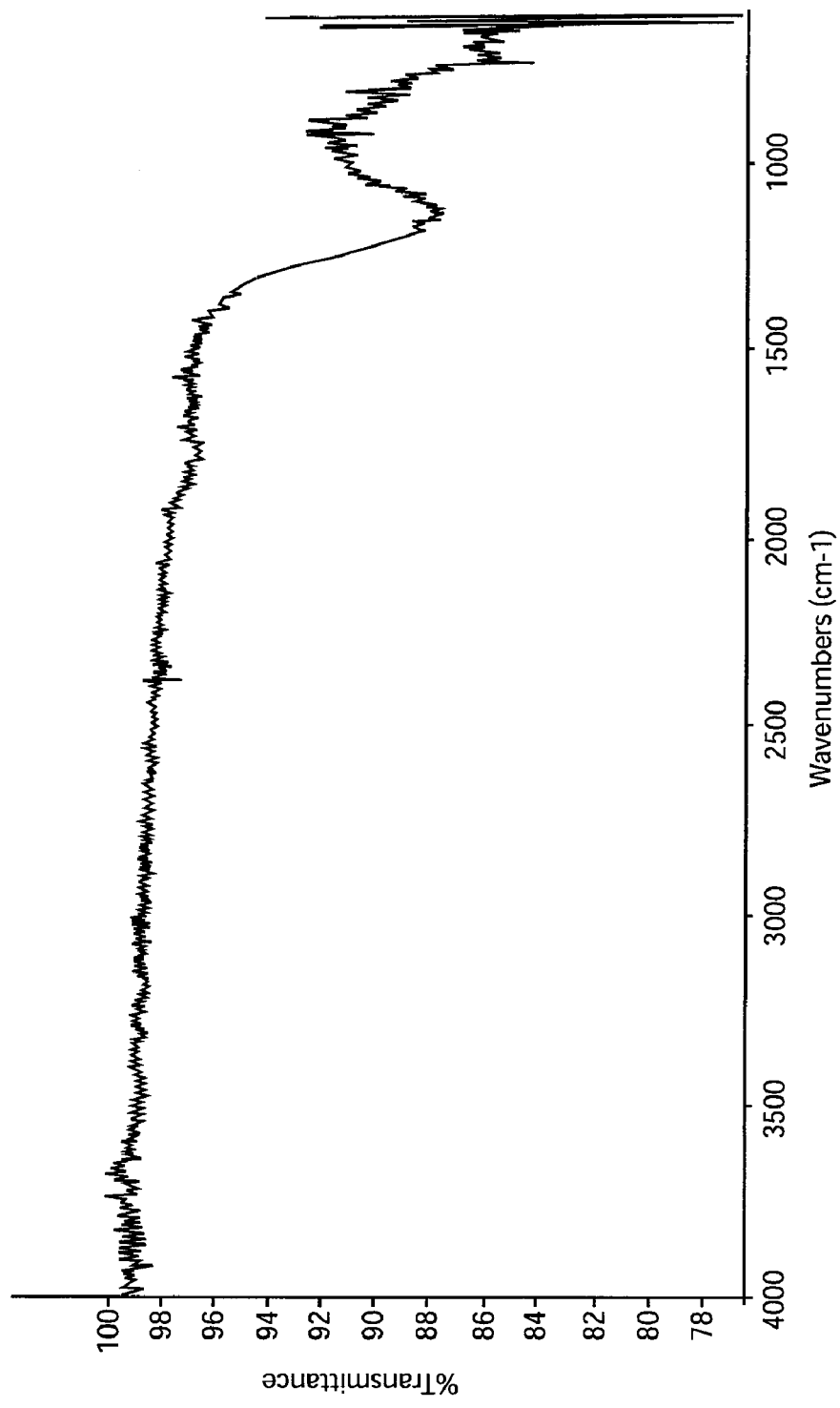
Figure 12:
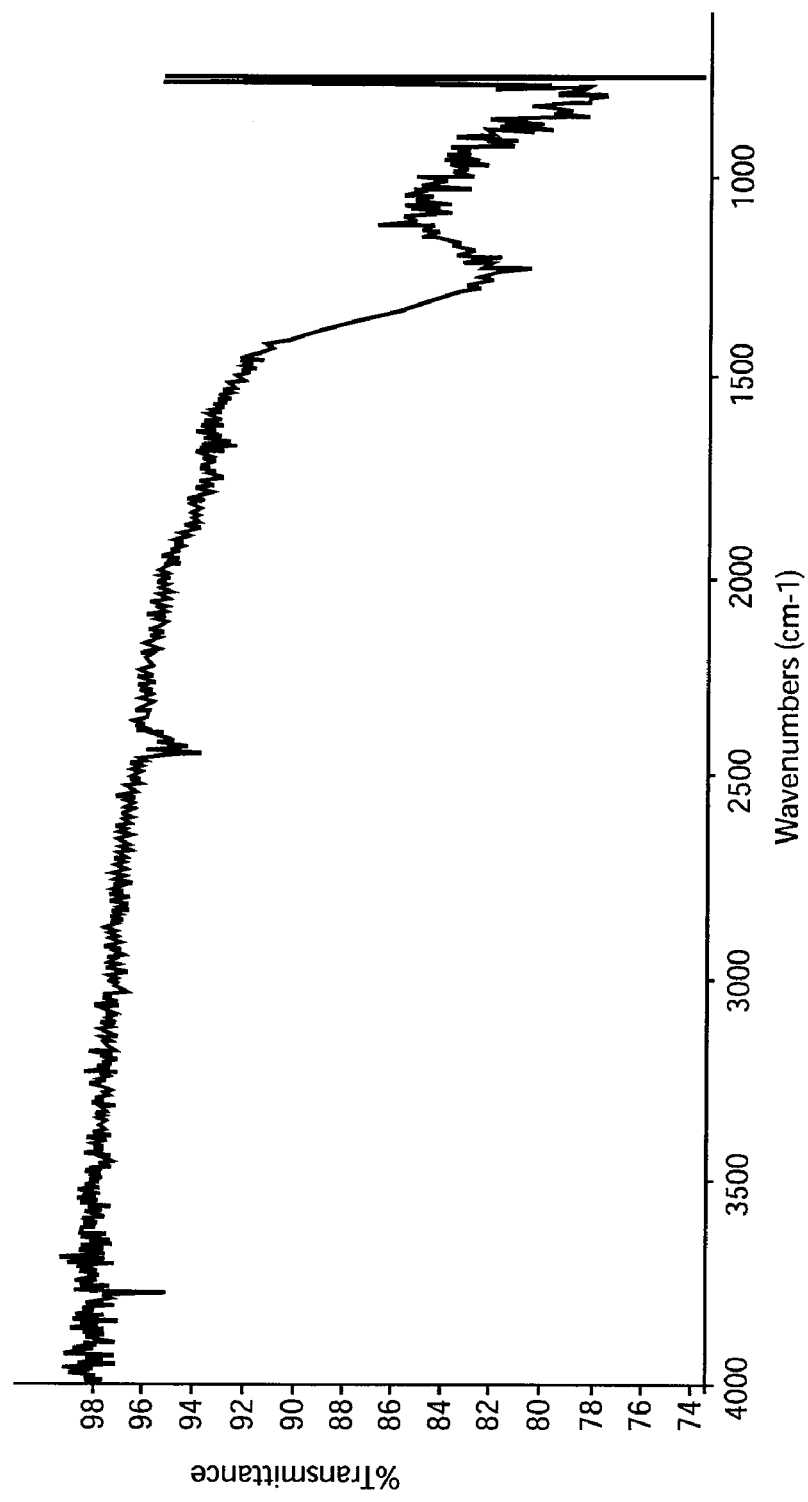
FIGS. 12-14 illustrate infrared spectrums for fluorinated samples of CP-X, levels L, M, and H respectively, according to exemplary embodiments.
Figure 13:
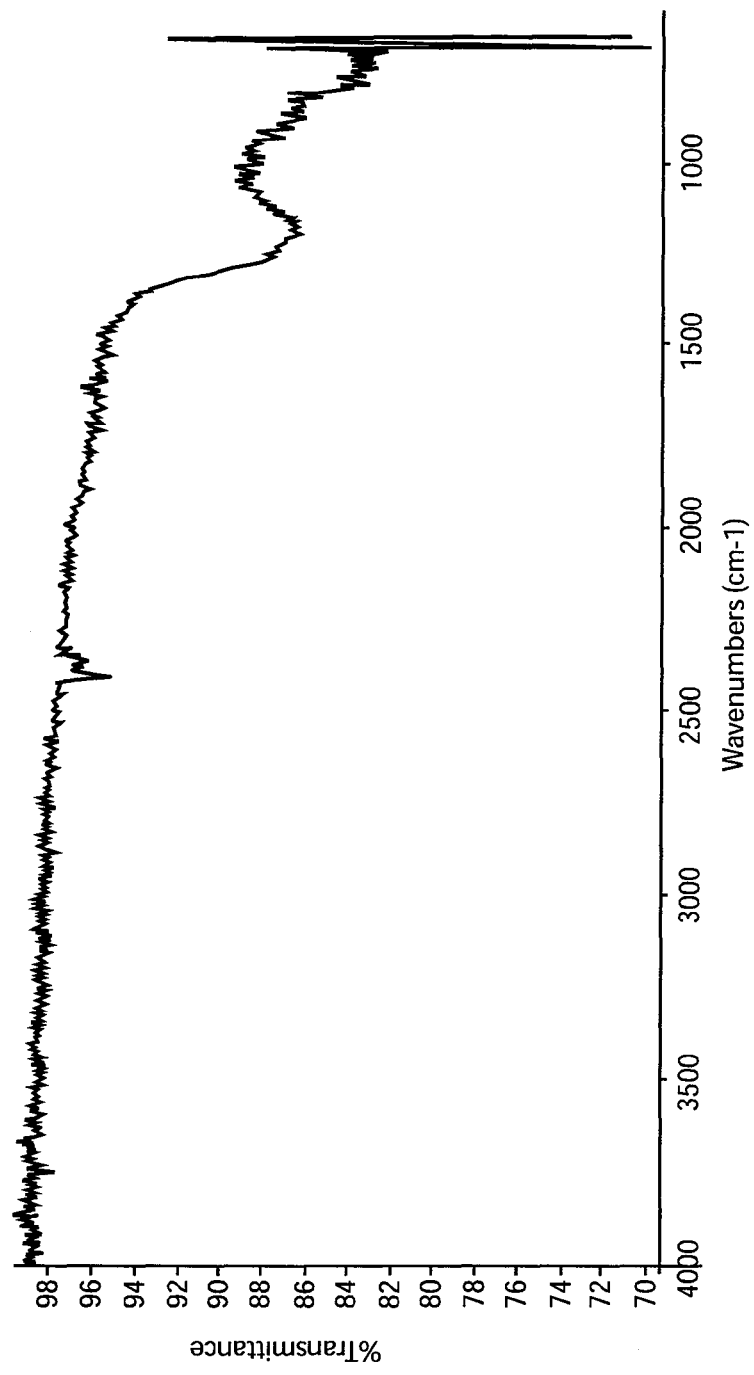
Figure 14:
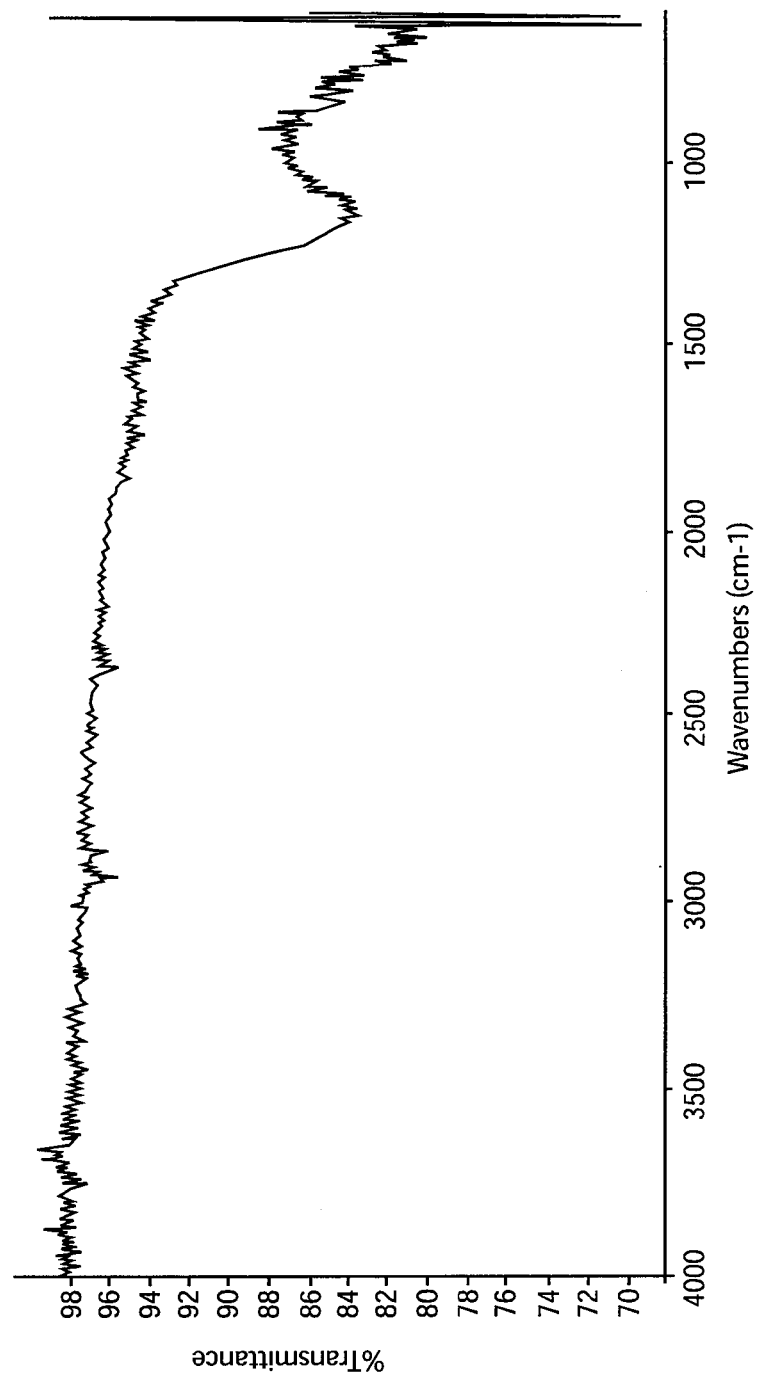
Figure 15:
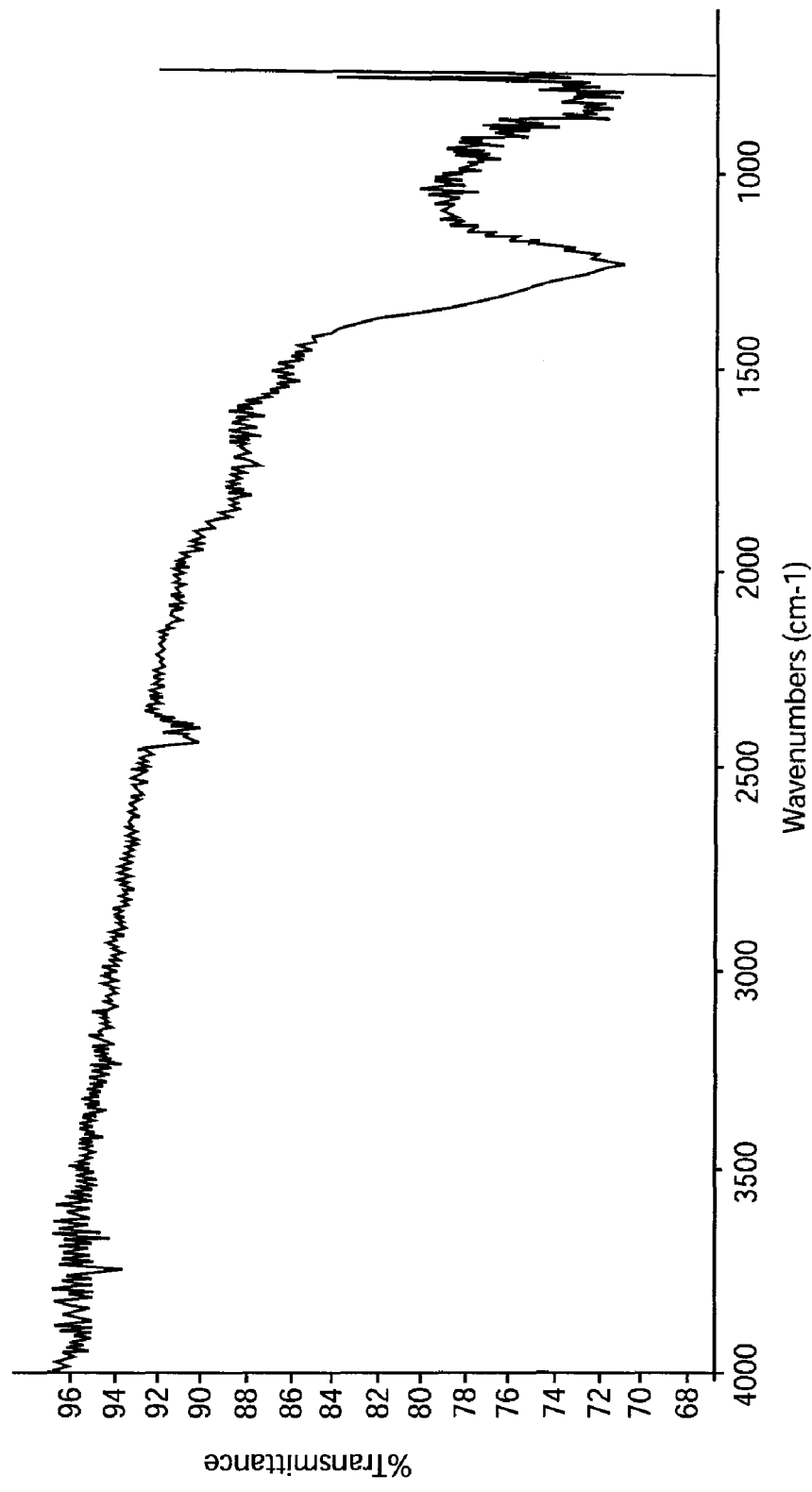
FIGS. 15-17 illustrate infrared spectrums for fluorinated samples of CP-H, levels L, M, and H respectively, according to exemplary embodiments.
Figure 16:
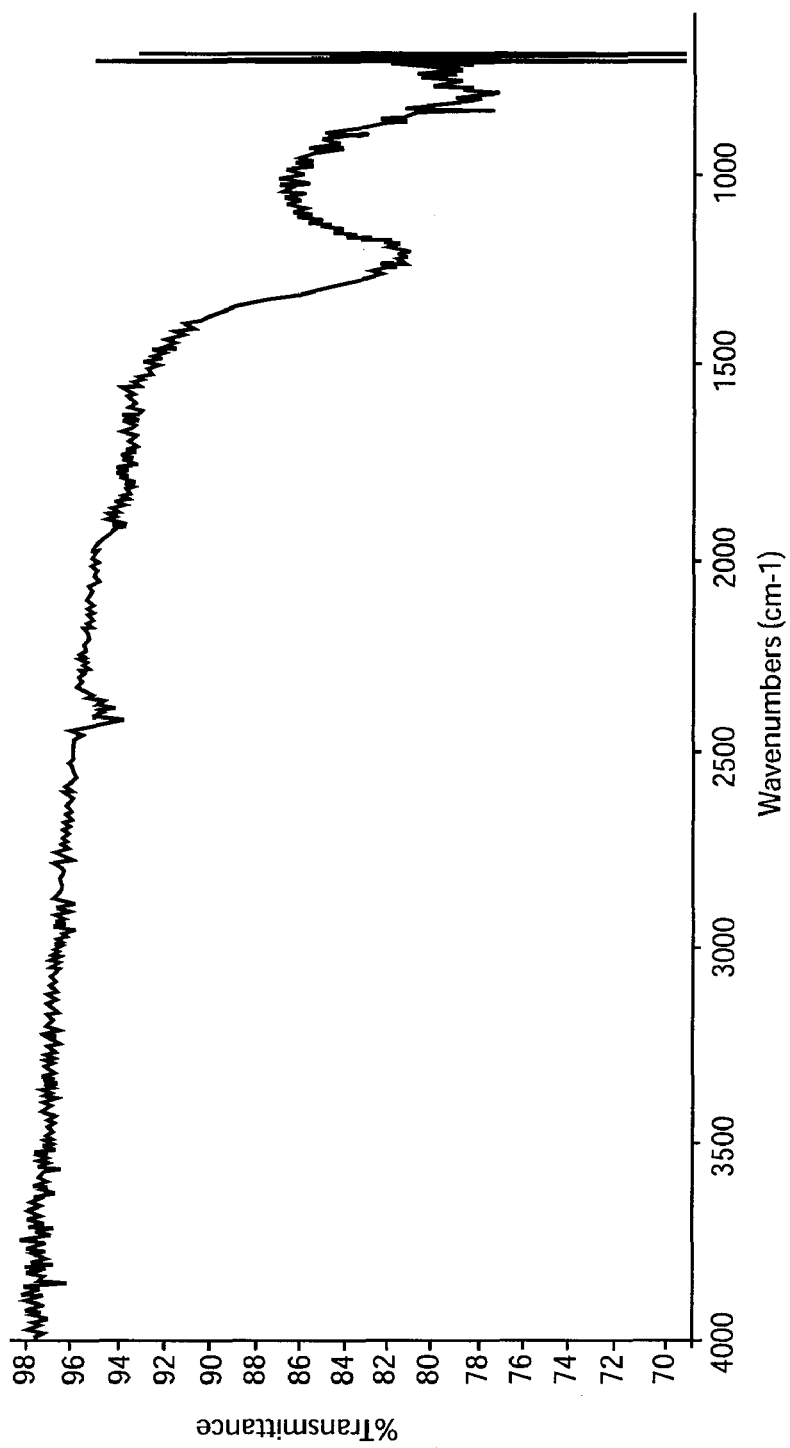
Figure 17:
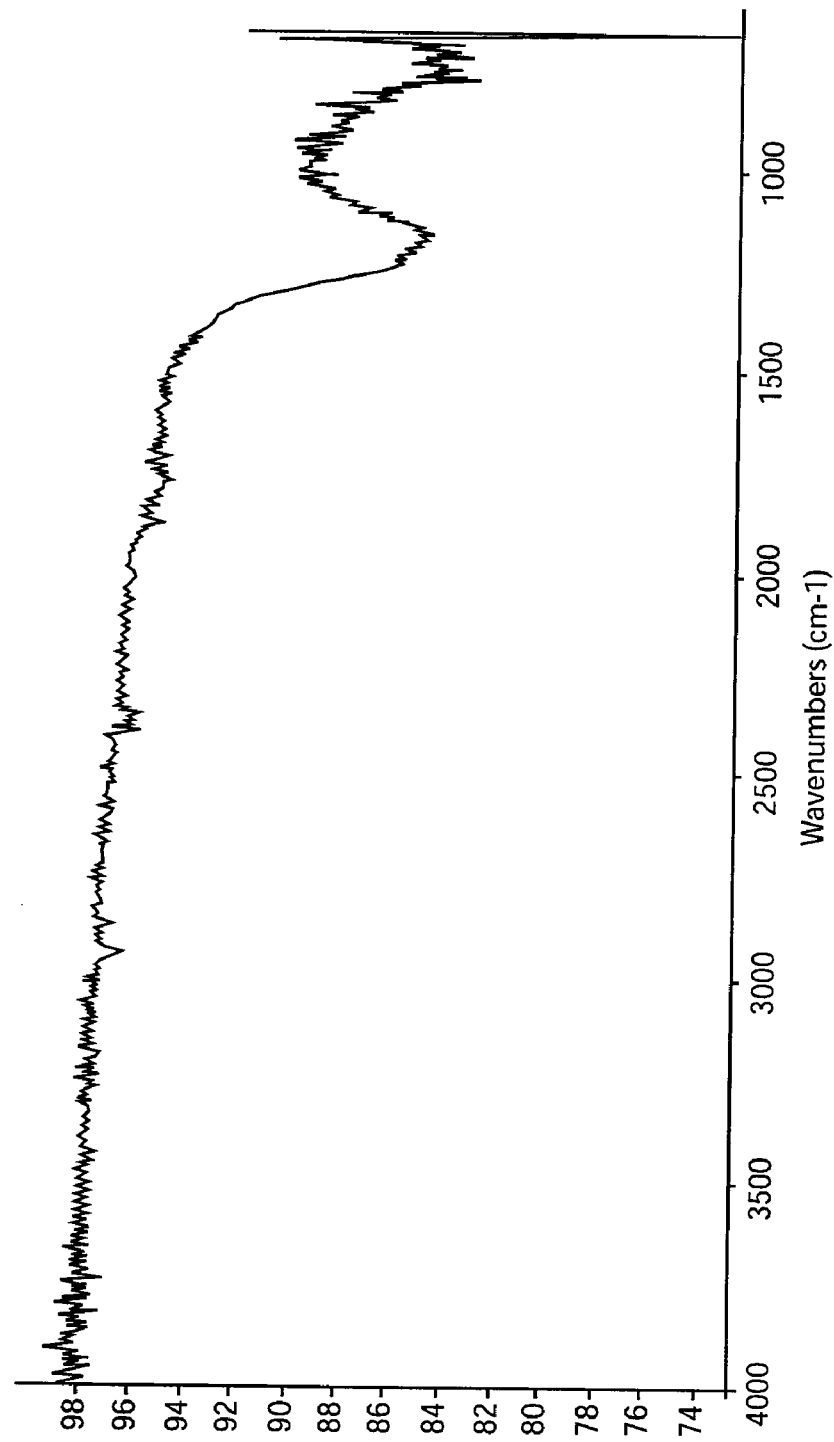

FIG. 8 shows the FTIR spectrum of CP-F sample. The strongest and broadest band between 1270 and 1100 cm$^{-1}$ is assigned to CF$_2$ bonds. The bands between 1470 and 1320 cm$^{-1}$ are due to CH$_2$ bonds from the (CH$_2$CF$_2$) section of the FKM backbone. FIGS. 9 through 17 show the FTIR spectra of fluorinated CP-N, CP-X and CP-H, Levels L, M and H, respectively. The presence of C—F bonds is detected on the strong band around 1200 cm$^{-1}$, which is not seen in FIGS. 5 through 7 for un-fluorinated nitriles but is seen in FIG. 8 for FKM. In addition, the bands assigned for CH bonds (3000-2850 cm$^{-1}$) and C=C bonds (1670-1640 cm$^{-1}$), which are seen in FIGS. 5 to 7 for the un-fluorinated nitriles, have diminished in FIGS. 9 to 17 for all the fluorinated nitriles. Most likely, during fluorination, CH bonds are substituted by CF bonds, while C=C double bonds are broken and consequently CFCF bonds are formed.

The IR bands at 2235 cm$^{-1}$ (CN nitrile triple bonds) remain in the spectra of most fluorinated nitriles, indicating that at least some of the CN nitrile groups have not been fluorinated. The IR band at 1730-1697 cm$^{-1}$ (carboxylic groups) seen in un-fluorinated CP-X (FIG. 6) diminished in fluorinated CP-X (FIGS. 12 to 14), resulting in the carboxylic groups reacting with fluorine during fluorination. Although the exact resultant chemical structure of this reaction is unclear based on this study, the uniqueness of fluorination of CP-X comparing with CP-N and CP-H is certain. This is consistent with their mechanical and fluid compatibility differences as discussed in the previous sections.

In other words, the FTIR results show clearly the presence of fluorine element in all fluorinated nitriles. The FTIR spectrum of a fluorinated NBR, XNBR or HNBR compound is more like that of FKM compound than its un-fluorinated counterpart. The spectra presented here are obtained from an ATR-FTIR testing, which determines the characteristics of sample surface to a depth of a few microns.

FTIR confirms that the fluorination has changed the surface of nitrile elastomers (NBR, XNBR and HNBR) into a layer very similar to FKM materials. This fluorinated layer acts as a barrier to block the zinc bromide attack and thus reduces the swelling volume change and enhances the retention of hardness and modulus in zinc bromide brine environments.

Figure 18:
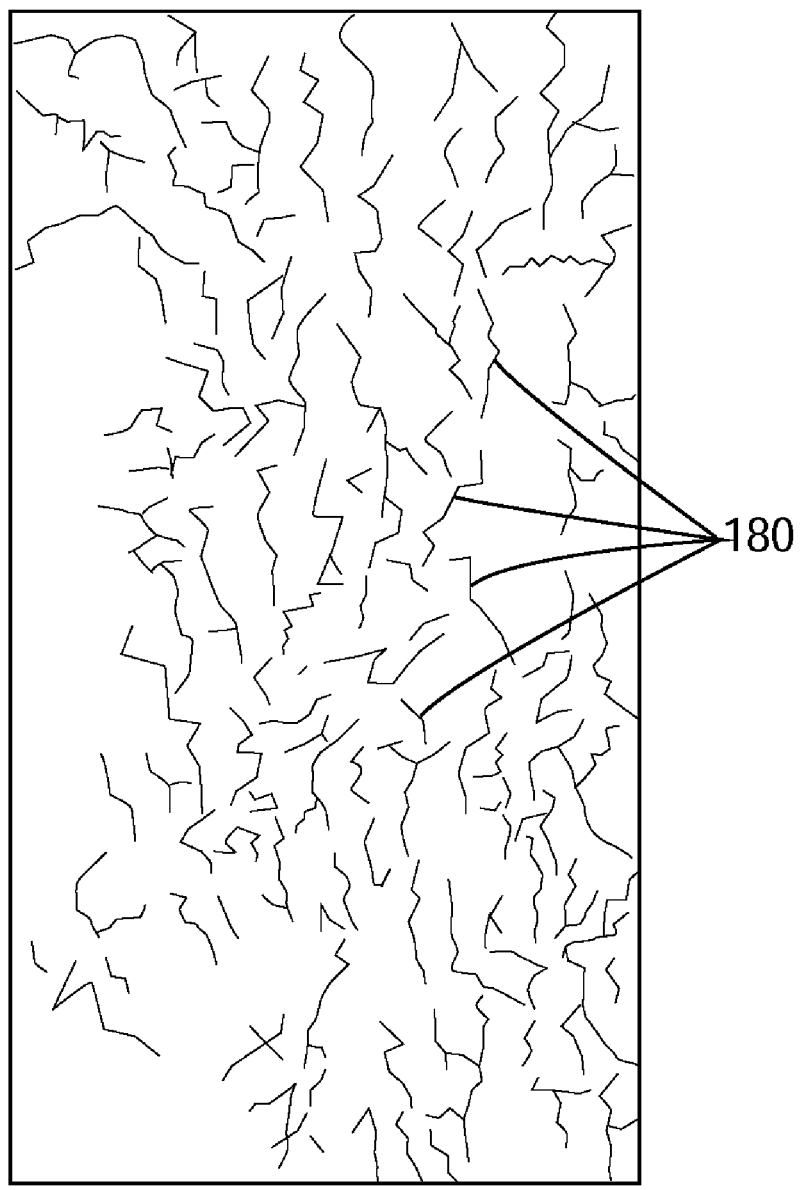
FIGS. 18-20 illustrate surfaces of the samples after fluorination according to exemplary embodiments.
Figure 19:
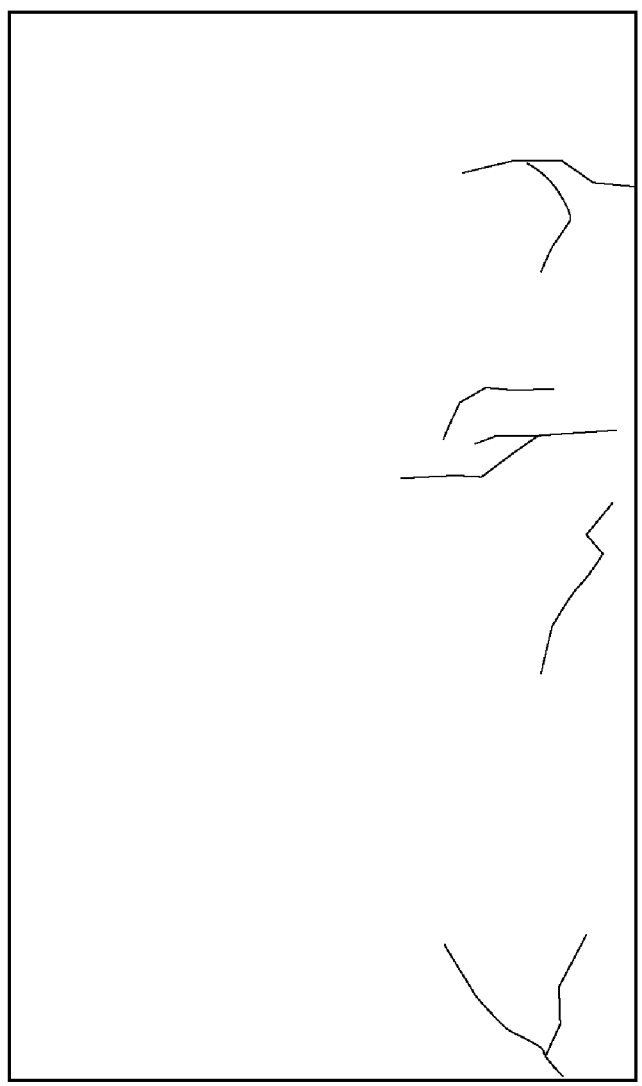
Figure 20:
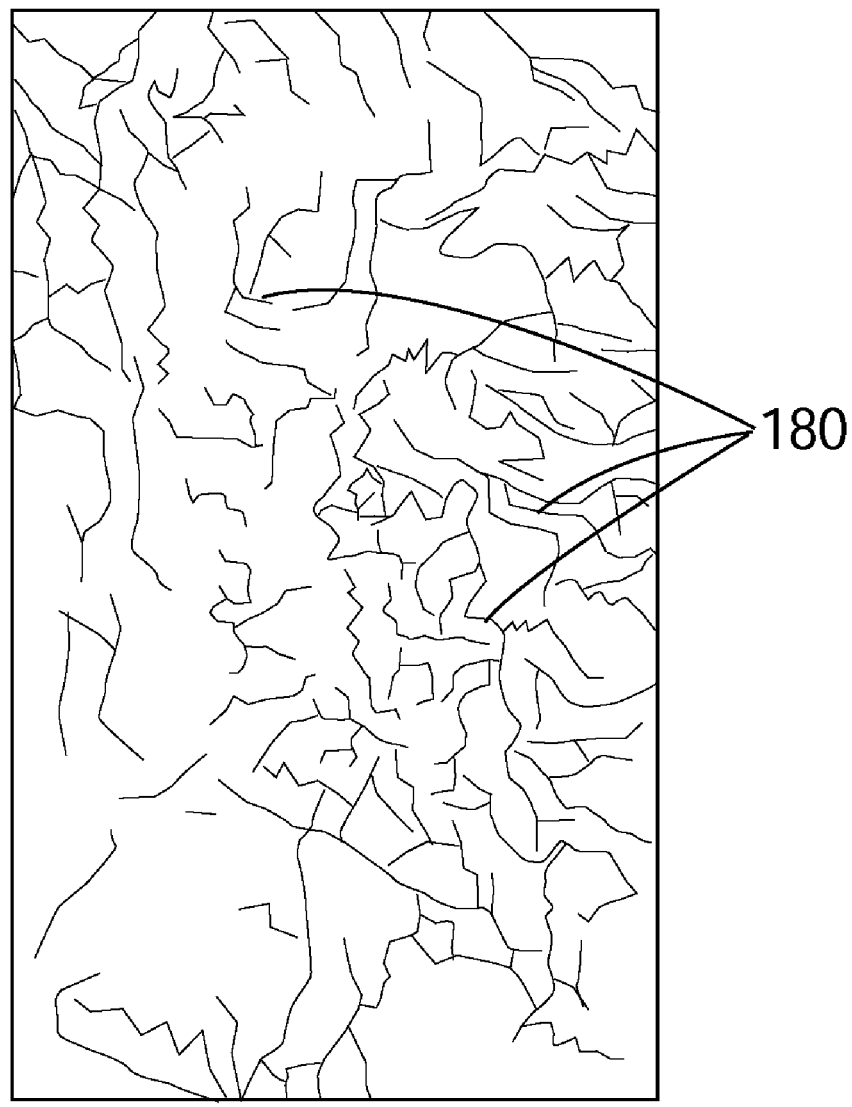

FIGS. 18 to 20 show optical microscopic pictures of the surfaces of high-level fluorinated CP-N, CP-X and CP-H, respectively, with the amplifier fact of 300×. For NBR compounds, it has been reported that fluorination created small cracks on the fluorinated surface. The cracks 180 were observed in the present tests on the surfaces of high level fluorinated CP-N(NBR) and CP-H(HNBR), as shown in FIGS. 18 and 20, respectively. However, there was not any crack seen on the surface of high-level fluorinated CP-X (XNBR) as shown in FIG. 19. The micro-cracks seen in FIGS. 18 and 20 can be a key point to understand the common tensile behaviors of fluorinated CP-N and CP-H, and the unique mechanical performances of fluorinated CP-X. As discussed with reference to Table 3, fluorination substantially reduced the ultimate tension properties, i.e., tensile and elongation, on CP-N and CP-H, but not on CP-X. The lower strengths of fluorinated CP-N and CP-H could result from the surface micro-cracks created in fluorination. Under tension stress, the cracks propagate and cause the catastrophic rupture at lower tensile and elongation.

Thus, it was discovered that CP-X is an XNBR compound which has unique carboxylic group in its macromolecular chains. The introducing of carboxylic group improves nitrile elastomer's physical properties especially surface wear and abrasion resistance. The present tests show that the XNBR sample of CP-X has strong surface resistance to the chemical etching of fluorination. The smooth surface without micro-cracks as shown in FIG. 19 for high-level fluorinated CP-X is consistent with its good retention of toughness, e.g., good retention in tensile and elongation.

Based on the above noted tests, it was determined that soaking in zinc bromide brine at elevated temperatures hardens and stiffens nitrile elastomers, including NBR (CP-N), XNBR (CP-X) and HNBR (CP-H). In other words, when exposed to $ZnBr_2$ fluids, the nitriles lose flexibility and elasticity, which is the major root cause of BOP elastomer failures in $ZnBr_2$ environments. Fluorination chemically bonds the fluorine element to the surfaces of the nitriles to form a fluorocarbon layer. Thus, the formed fluorocarbon barrier reduces the diffusion of $ZnBr_2$ brine into the nitrile matrix, e.g., reducing $ZnBr_2$ swelling of the nitriles. This fluorocarbon protection layer improves the retention of nitriles' flexibility and elasticity in $ZnBr_2$ exposure, e.g., the retention of their hardness and modulus.

Fluorination creates micro-cracks on the surfaces of fluorinated NBR and HNBR samples, which results in lower tensile and elongation. There are no micro-cracks seen on fluorinated XNBR (CP-X) surfaces, attributing to its excellent wear resistance not only to physical abrasion, but also to chemical fluorine etching as found in this experiment, which results in better retention of tensile and elongation. The present finding indicates that the unexpected properties of the XNBR compounds, such as CP-X, may be the first choice to be fluorinated for BOP elastomer applications in zinc bromide environments.

For fluorinated NBR and HNBR compounds such as CP-N and CP-H, the micro-cracks created in fluorination result in poor ultimate properties in the tension tests of ASTM dumbbell coupons. If the cracks propagate to initiate failure at lower pressure or fewer cycles, the application of fluorination on NBR and HNBR would be limited. For the NBR and HNBR compounds, with the increase of fluorination levels, the compatibility with zinc bromide brine is enhanced but the toughness decreases. An optional fluorination level for the balance of these properties, i.e., level-M, may be used.

Figure 21:
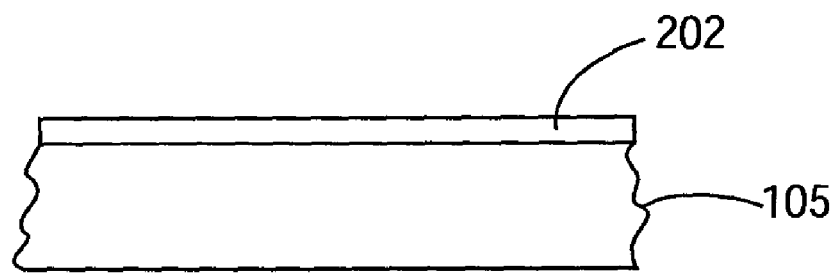
FIG. 21 illustrates a distribution of fluorine atoms on a packer unit according to an exemplary embodiment.

According to an exemplary embodiment shown in FIG. 21, a packer unit 200 to be used in an annular blowout preventer includes an elastomer body 105 (only a section of the whole body is shown in the figure) that including the CP-X compound of a carboxylated nitrile rubber (XNBR) base polymer having a polymer chain. A quantity of fluorine atoms is attached to the polymer chain and this quantity of fluorine atoms is shown as layer 202. It is to be understood that the fluorine atoms, are connected to the individual atoms (C for example) in the polymer chain. The layer 202 of fluorine atoms may appear as coating the elastomer body 105, e.g., forms an interface between the elastomer body 105 and the ambient. According to an exemplary embodiment, the quantity of fluorine atoms that attach to the polymer chain displace at least an equal quantity of hydrogen atoms (that are attached to the chain prior to the fluorination) from the polymer chain when the elastomer body is fluorinated. However, the quantity of fluorine atoms may be higher as double bonds between carbon atoms of the chain may be broken during fluorination and the fluorine atoms may attach to these carbon atoms without removing corresponding hydrogen atoms. Although this application has been discussed with regard to a packer unit, it is noted that the fluorinated CP-X compound may be used in other devices used in the oil and gas industry, e.g., top seal, diaphragm, ram BOP, etc.

The disclosed exemplary embodiments provide a packer unit and a blowout preventer that better resist to chemical degradation than conventional units. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A packer unit to be used in an annular blowout preventer, the packer unit comprising:
   an elastomer body including a compound of a carboxylated nitrile rubber (XNBR) base polymer having a polymer chain; and
   a quantity of fluorine atoms attached to the polymer chain, wherein the compound includes between 50 and 60% XNBR, between 25 to 35% carbon black, and the rest includes other materials, and
   the quantity of fluorine atoms displaces at least an equal quantity of hydrogen atoms from the polymer chain when the elastomer body is fluorinated.

2. The packer unit of claim 1, wherein a ratio of the quantity of fluorine atoms to a quantity of carbon atoms of the compound is between 0.10 and 0.18.

3. The packer unit of claim 2, wherein a change between (i) a control compound of a carboxylated nitrile rubber (XNBR) base polymer having a polymer chain and no fluorine atoms, and (ii) the compound of the carboxylated nitrile rubber (XNBR) base polymer having the polymer chain and the quantity of fluorine atoms attached to the polymer chain is about −2% for tensile, 14% for elongation, −8% for 100 Mod, −2 for Hardness and 77% for tear.

4. The packer unit of claim 2, wherein the other materials include sulfur, antioxidants, plasticizers; process aids, accelerators, and ZnO based compounds.

5. The packer unit of claim 2, wherein a change between (i) a control compound of a carboxylated nitrile rubber (XNBR) base polymer having a polymer chain and no fluorine atoms, and (ii) the compound of the carboxylated nitrile rubber (XNBR) base polymer having the polymer chain, the quantity of fluorine atoms attached to the polymer chain and being soaked in $ZnBr_2$ for about 7 days at 85° C. is about −19% for tensile, −42% for elongation, 34% for 100 Mod, 3 for Hardness, −47% for tear, and 2.5% for volume.

6. The packer unit of claim 2, wherein a change between (i) a control compound of a carboxylated nitrile rubber (XNBR) base polymer having a polymer chain and no fluorine atoms, and (ii) the compound of the carboxylated nitrile rubber (XNBR) base polymer having the polymer chain, the quantity of fluorine atoms attached to the polymer chain and being soaked in diesel for about 7 days at 85° C. is about −23% for tensile, −31% for elongation, −15% for 100 Mod, −8 for Hardness, −59% for tear, and 19% for volume.

7. The packer unit of claim 1, wherein a ratio of the quantity of fluorine atoms to a quantity of carbon atoms of the compound is between 0.18 and 0.26.

8. The packer unit of claim 7, wherein a change between (i) a control compound of a carboxylated nitrile rubber (XNBR) base polymer having a polymer chain and no fluorine atoms, and (ii) the compound of the carboxylated nitrile rubber (XNBR) base polymer having the polymer chain and the quantity of fluorine atoms attached to the polymer chain is about −16% for tensile, 21% for elongation, −31% for 100 Mod, −5 for Hardness and 50% for tear.

9. The packer unit of claim 7, wherein the other materials include sulfur, antioxidants, plasticizers, process aids, accelerators, and ZnO based compounds.

10. The packer unit of claim 7, wherein a change between (i) a control compound of a carboxylated nitrile rubber (XNBR) base polymer having a polymer chain and no fluorine atoms, and (ii) the compound of the carboxylated nitrile rubber (XNBR) base polymer having the polymer chain, the quantity of fluorine atoms attached to the polymer chain and being soaked in $ZnBr_2$ for about 7 days at 85° C. is about −19% for tensile, −41% for elongation, 43% for 100 Mod, 4 for Hardness, −37% for tear, and 2% for volume.

11. The packer unit of claim 7, wherein a change between (i) a control compound of a carboxylated nitrile rubber (XNBR) base polymer having a polymer chain and no fluorine atoms, and (ii) the compound of the carboxylated nitrile rubber (XNBR) base polymer having the polymer chain, the quantity of fluorine atoms attached to the polymer chain and being soaked in diesel for about 7 days at 85° C. is about −16% for tensile, −23% for elongation, −14% for 100 Mod, −11 for Hardness, −51% for tear, and 20% for volume.

12. The packer unit of claim 1, wherein a ratio of the quantity of fluorine atoms to a quantity of carbon atoms of the compound is between 0.26 and 0.34.

13. The packer unit of claim 12, wherein a change between (i) a control compound of a carboxylated nitrile rubber (XNBR) base polymer having a polymer chain and no fluorine atoms, and (ii) the compound of the carboxylated nitrile rubber (XNBR) base polymer having the polymer chain and the quantity of fluorine atoms attached to the polymer chain is about −13 for tensile, 28 for elongation, −30 for 100 Mod, −5 for Hardness and 51 for tear.

14. The packer unit of claim 12, wherein the other materials include sulfur, antioxidants, plasticizers, process aids, accelerators, and ZnO based compounds.

15. The packer unit of claim 12, wherein a change between (i) a control compound of a carboxylated nitrile rubber (XNBR) base polymer having a polymer chain and no fluorine atoms, and (ii) the compound of the carboxylated nitrile rubber (XNBR) base polymer having the polymer chain, the quantity of fluorine atoms attached to the polymer chain and being soaked in $ZnBr_2$ for about 7 days at 85° C. is about −17% for tensile, −40% for elongation, 36% for 100 Mod, 3 for Hardness, −36% for tear, and 2% for volume.

16. The packer unit of claim 12, wherein a change between (i) a control compound of a carboxylated nitrile rubber (XNBR) base polymer having a polymer chain and no fluorine atoms, and (ii) the compound of the carboxylated nitrile rubber (XNBR) base polymer having the polymer chain, the quantity of fluorine atoms attached to the polymer chain, and being soaked in diesel for about 7 days at 85° C. is about −21% for tensile, −23% for elongation, −24% for 100 Mod, −11 for Hardness, −49% for tear, and 20% for volume.

17. An annular blowout preventer to be installed on a well, the annular blowout preventer comprising:
   a housing having a bore extending therethrough about a longitudinal axis;
   a packing unit disposed within the housing about the longitudinal axis; and
   a piston configured to move along the longitudinal axis and to squeeze the packing unit towards the longitudinal axis,
   wherein the packing unit includes,
      an elastomer body including a compound of a carboxylated nitrile rubber (XNBR) base polymer having a polymer chain, and
      a quantity of fluorine atoms attached to the polymer chain,
      wherein the compound includes between 50 and 60% XNBR, between 25 to 35% carbon black, and the rest includes other materials, and
      the quantity of fluorine atoms displaces at least an equal quantity of hydrogen atoms from the polymer chain when the elastomer body is fluorinated.

18. The annular blowout preventer of claim 17, wherein a ratio of the quantity of fluorine atoms to a quantity of carbon atoms of the compound is between 0.18 and 0.26.

19. The annular blowout preventer of claim 17, wherein a ratio of the quantity of fluorine atoms to a quantity of carbon atoms of the compound is between 0.26 and 0.34.

20. A device comprising:
- an elastomer body including a compound of a carboxylated nitrile rubber (XNBR) base polymer having a polymer chain; and
- a quantity of fluorine atoms attached to the polymer chain, wherein the compound includes between 50 and 60% XNBR, between 25 to 35% carbon black, and the rest includes other materials, and
- the quantity of fluorine atoms displaces at least an equal quantity of hydrogen atoms from the polymer chain when the elastomer body is fluorinated.

* * * * *